US012610135B2

(12) United States Patent
Cho et al.

(10) Patent No.: US 12,610,135 B2
(45) Date of Patent: Apr. 21, 2026

(54) METHODS AND SYSTEMS FOR PERFORMING OBJECT DIMENSIONING

(71) Applicant: Analog Devices, Inc., Wilmington, MA (US)

(72) Inventors: Peter Leslie Cho, Westford, MA (US); Abdullah Shamil Hashim Al Dujailli, Shrewsbury, MA (US)

(73) Assignee: Analog Devices, Inc., Wilmington, MA (US)

( * ) Notice: Subject to any disclaimer, the term of this patent is extended or adjusted under 35 U.S.C. 154(b) by 325 days.

(21) Appl. No.: 18/189,934

(22) Filed: Mar. 24, 2023

(65) Prior Publication Data

US 2023/0306626 A1 Sep. 28, 2023

Related U.S. Application Data

(60) Provisional application No. 63/324,042, filed on Mar. 26, 2022, provisional application No. 63/324,043, filed on Mar. 26, 2022.

(51) Int. Cl.
*H04N 23/60* (2023.01)
*G06T 3/60* (2006.01)
(Continued)

(52) U.S. Cl.
CPC .............. *H04N 23/64* (2023.01); *G06T 3/60* (2013.01); *G06T 7/38* (2017.01); *G06T 7/60* (2013.01);
(Continued)

(58) Field of Classification Search
CPC ...... H04N 23/64; H04N 23/62; H04N 23/633; H04N 23/634; G06T 3/60; G06T 7/38;
(Continued)

(56) References Cited

U.S. PATENT DOCUMENTS 9,734,553 B1 * 8/2017 Naware .................... G09G 5/00
9,858,640 B1 * 1/2018 Earl ......................... G06T 11/60
(Continued)

FOREIGN PATENT DOCUMENTS

CN 112161572 A 1/2021
EP 3012601 A1 4/2016
(Continued)

OTHER PUBLICATIONS

Anonymous, "Week 3.0: 3D Scanning," Jan. 2015, Retrieved from the Internet: <URL:http://fab.cba.mit.edu/classes/863.15/section. CBA/people/Shtarbanov/week3.0.html>, pp. 1-4.
(Continued)

*Primary Examiner* — Bobbak Safaipour
(74) *Attorney, Agent, or Firm* — ArentFox Schiff LLP

(57) ABSTRACT

Aspects of the present disclosure include isolating a target scene object from multiple images of a time-of-flight (TOF) sensor. Multiple images from a TOF sensor can be transformed into multiple three-dimensional (3D) point clouds. In each of the multiple 3D point clouds, one or more large planes having a minimal threshold size can be identified. A common 3D point cloud can be generated by aligning rotated and translated point clouds corresponding to at least a portion of the multiple 3D point clouds. The common 3D point cloud can be rotated and translated to have one of one or more large planes identified as a ground plane within a common coordinate system of the common 3D point cloud, and a target object can be isolated.

17 Claims, 10 Drawing Sheets

(51) Int. Cl.

| | |
|---|---|
| *G06T 7/38* | (2017.01) |
| *G06T 7/60* | (2017.01) |
| *G06T 7/70* | (2017.01) |
| *G06T 11/00* | (2006.01) |
| *H04N 23/62* | (2023.01) |
| *H04N 23/63* | (2023.01) |

(52) U.S. Cl.
CPC ................ *G06T 7/70* (2017.01); *G06T 11/00* (2013.01); *H04N 23/62* (2023.01); *H04N 23/633* (2023.01); *G06T 2200/24* (2013.01); *G06T 2207/10028* (2013.01); *G06T 2210/56* (2013.01)

(58) Field of Classification Search
CPC ... G06T 7/60; G06T 7/70; G06T 11/00; G06T 2200/24; G06T 2207/10028; G06T 2210/56; G06T 7/33; G06T 2207/10016

See application file for complete search history.

(56) References Cited

U.S. PATENT DOCUMENTS

| | | | | |
|---|---|---|---|---|
| 9,897,434 | B2 * | 2/2018 | Ackley | ............... G01B 11/026 |
| 11,265,668 | B1 | 3/2022 | Patil | |
| 2016/0063754 | A1 * | 3/2016 | Korchev | ................ G06V 20/38 |
| | | | | 345/419 |
| 2016/0284121 | A1 | 9/2016 | Azuma | |
| 2018/0143321 | A1 * | 5/2018 | Skowronek | ............. G01S 17/66 |
| 2018/0147325 | A1 | 5/2018 | Lee | |
| 2020/0257888 | A1 | 8/2020 | Ebihara | |
| 2020/0357166 | A1 | 11/2020 | Linaker | |
| 2021/0142039 | A1 | 5/2021 | Shreve | |
| 2021/0183080 | A1 * | 6/2021 | Hoiem | .................... G06T 19/20 |
| 2021/0400210 | A1 | 12/2021 | Thibault | |
| 2022/0057518 | A1 * | 2/2022 | Brenner | ............... G01S 17/894 |

| | | | | |
|---|---|---|---|---|
| 2023/0281827 | A1 * | 9/2023 | Chan | .................... G01S 7/4808 |
| | | | | 345/419 |
| 2023/0306629 | A1 * | 9/2023 | Cho | .......................... G06T 7/60 |
| 2023/0308746 | A1 * | 9/2023 | Ajamian | ................. G06T 11/00 |
| 2023/0326060 | A1 * | 10/2023 | Cho | .......................... G06T 7/60 |
| | | | | 382/289 |

FOREIGN PATENT DOCUMENTS

| | | | |
|---|---|---|---|
| EP | 3232404 | A1 | 10/2017 |
| EP | 3675040 | A1 | 7/2020 |
| WO | 2017096299 | A1 | 6/2017 |
| WO | 2021119024 | A1 | 6/2021 |

OTHER PUBLICATIONS

International Search Report and Written Opinion in PCT/US2023/016335, mailed Jul. 13, 2023, 16 pages.

International Search Report and Written Opinion in PCT/US2023/016337, mailed Jul. 14, 2023, 14 pages.

International Search Report and Written Opinion in PCT/US2023/016339, mailed Jul. 14, 2023, 10 pages.

Prasetiyowati et al. "Determining threshold value on information gain feature selection to increase speed and prediction accuracy of random forest," Journal of Big Data, Jun. 2021, vol. 8, No. 84, pp. 1-22.

Wang, Goulin, et al. "Point cloud simplification algorithm based on the feature of adaptive curvature entropy" Measurement Science and Technology, vol. 3222, No. 6, Mar. 30, 2021, p. 065004, https://dpi.org/10.1088/1361-6501/abd497. (Year 2021).

El Banani, Mohamed, et al. "UnsupervisedR&R: Unsupervised point cloud registration via differentiable rendering.:" 2021 IEEE/CVF Conference on Computer Vision and Pattern Recognition (CVPR), Jun. 2021, pp. 7125-7135, https://doi.org/10.1109/cvpr45437.2021.00705. (Year 2021).

* cited by examiner

FEATURES

MULTI-CLOUD STITCHING COMPONENT 166

TIEPOINT MATCHING COMPONENT 302

OUTLIER REJECTING COMPONENT 304

CLOUD PAIR REGISTERING COMPONENT 306

MOTION SYNCHRONIZING COMPONENT 308

BUNDLE ADJUSTING COMPONENT 310

AGGREGATED CLOUD AND RECONSTRUCTED FRUSTA IN FIRST TOF'S COORDINATE SYSTEM

500

502

OBTAIN, FROM A TOF SENSOR, MULTIPLE IMAGES CAPTURED OF AN OBJECT

504

VALIDATE WHETHER THE MULTIPLE IMAGES ARE TAKEN AT DESIRED POSES RELATIVE TO THE OBJECT

506

YES     IMAGES TAKEN AT DESIRED POSES?     NO

508

510

PROVIDE THE MULTIPLE IMAGES FOR OBJECT DIMENSIONING TO COMPUTE OR DISPLAY DIMENSIONS OF THE OBJECT

TRIGGER ERROR OR OTHER FEEDBACK

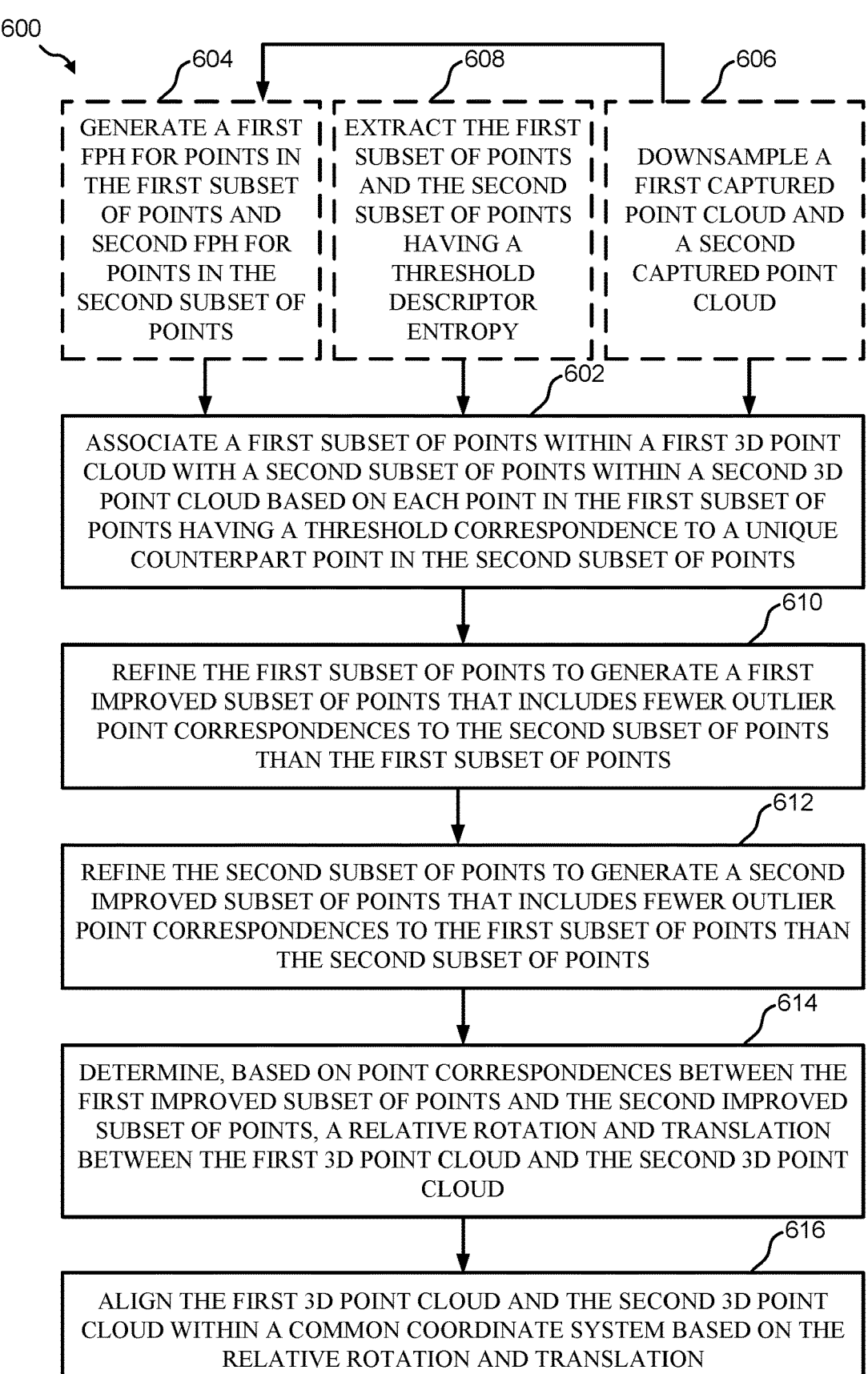

600

604
GENERATE A FIRST FPH FOR POINTS IN THE FIRST SUBSET OF POINTS AND SECOND FPH FOR POINTS IN THE SECOND SUBSET OF POINTS

608
EXTRACT THE FIRST SUBSET OF POINTS AND THE SECOND SUBSET OF POINTS HAVING A THRESHOLD DESCRIPTOR ENTROPY

606
DOWNSAMPLE A FIRST CAPTURED POINT CLOUD AND A SECOND CAPTURED POINT CLOUD

602
ASSOCIATE A FIRST SUBSET OF POINTS WITHIN A FIRST 3D POINT CLOUD WITH A SECOND SUBSET OF POINTS WITHIN A SECOND 3D POINT CLOUD BASED ON EACH POINT IN THE FIRST SUBSET OF POINTS HAVING A THRESHOLD CORRESPONDENCE TO A UNIQUE COUNTERPART POINT IN THE SECOND SUBSET OF POINTS

610
REFINE THE FIRST SUBSET OF POINTS TO GENERATE A FIRST IMPROVED SUBSET OF POINTS THAT INCLUDES FEWER OUTLIER POINT CORRESPONDENCES TO THE SECOND SUBSET OF POINTS THAN THE FIRST SUBSET OF POINTS

612
REFINE THE SECOND SUBSET OF POINTS TO GENERATE A SECOND IMPROVED SUBSET OF POINTS THAT INCLUDES FEWER OUTLIER POINT CORRESPONDENCES TO THE FIRST SUBSET OF POINTS THAN THE SECOND SUBSET OF POINTS

614
DETERMINE, BASED ON POINT CORRESPONDENCES BETWEEN THE FIRST IMPROVED SUBSET OF POINTS AND THE SECOND IMPROVED SUBSET OF POINTS, A RELATIVE ROTATION AND TRANSLATION BETWEEN THE FIRST 3D POINT CLOUD AND THE SECOND 3D POINT CLOUD

616
ALIGN THE FIRST 3D POINT CLOUD AND THE SECOND 3D POINT CLOUD WITHIN A COMMON COORDINATE SYSTEM BASED ON THE RELATIVE ROTATION AND TRANSLATION

LHS point cloud

702

RHS point cloud

704

706

*f*

*f'*

*F*

*F'*

3D world space 3D descriptor space

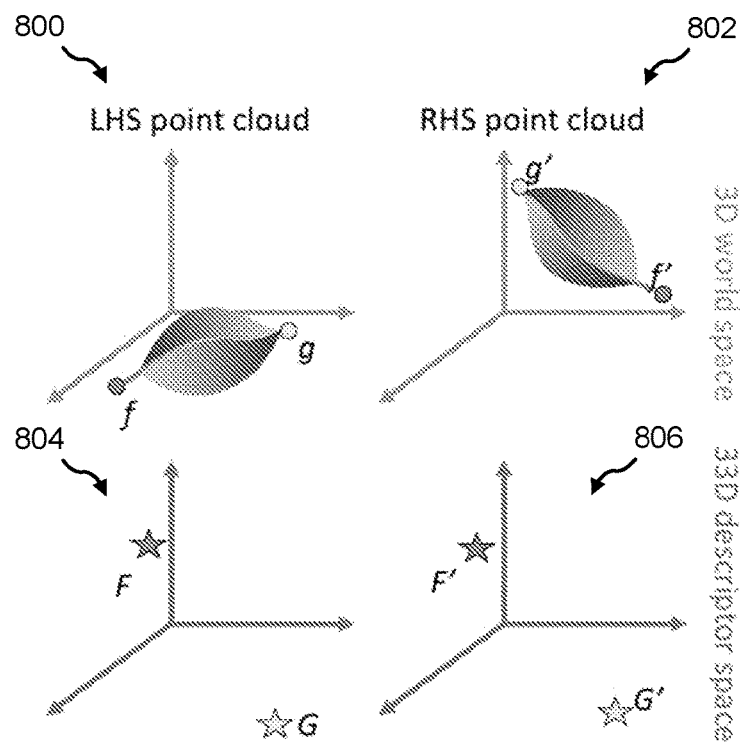
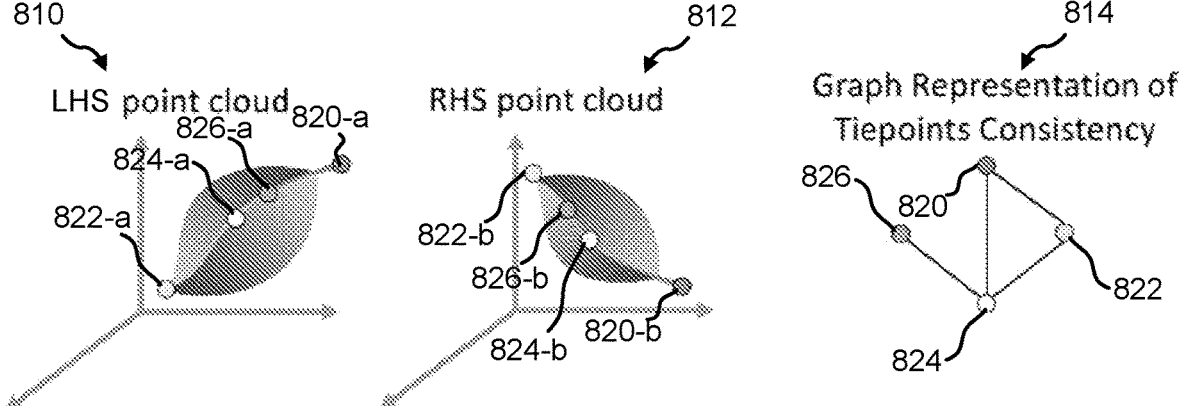
*FIG. 8*

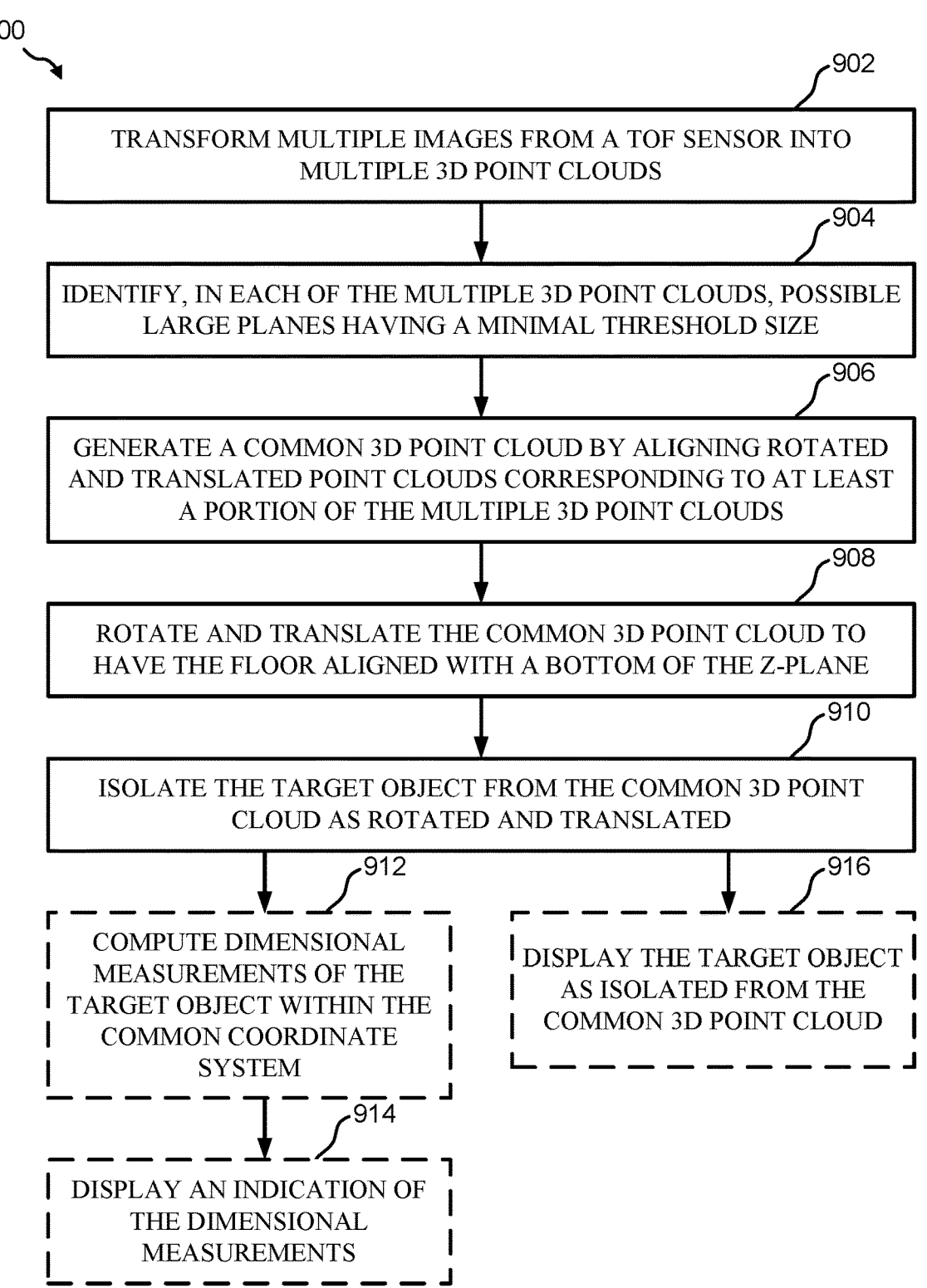

900

902

TRANSFORM MULTIPLE IMAGES FROM A TOF SENSOR INTO MULTIPLE 3D POINT CLOUDS

904

IDENTIFY, IN EACH OF THE MULTIPLE 3D POINT CLOUDS, POSSIBLE LARGE PLANES HAVING A MINIMAL THRESHOLD SIZE

906

GENERATE A COMMON 3D POINT CLOUD BY ALIGNING ROTATED AND TRANSLATED POINT CLOUDS CORRESPONDING TO AT LEAST A PORTION OF THE MULTIPLE 3D POINT CLOUDS

908

ROTATE AND TRANSLATE THE COMMON 3D POINT CLOUD TO HAVE THE FLOOR ALIGNED WITH A BOTTOM OF THE Z-PLANE

910

ISOLATE THE TARGET OBJECT FROM THE COMMON 3D POINT CLOUD AS ROTATED AND TRANSLATED

912

COMPUTE DIMENSIONAL MEASUREMENTS OF THE TARGET OBJECT WITHIN THE COMMON COORDINATE SYSTEM

916

DISPLAY THE TARGET OBJECT AS ISOLATED FROM THE COMMON 3D POINT CLOUD

914

DISPLAY AN INDICATION OF THE DIMENSIONAL MEASUREMENTS

*FIG. 9*

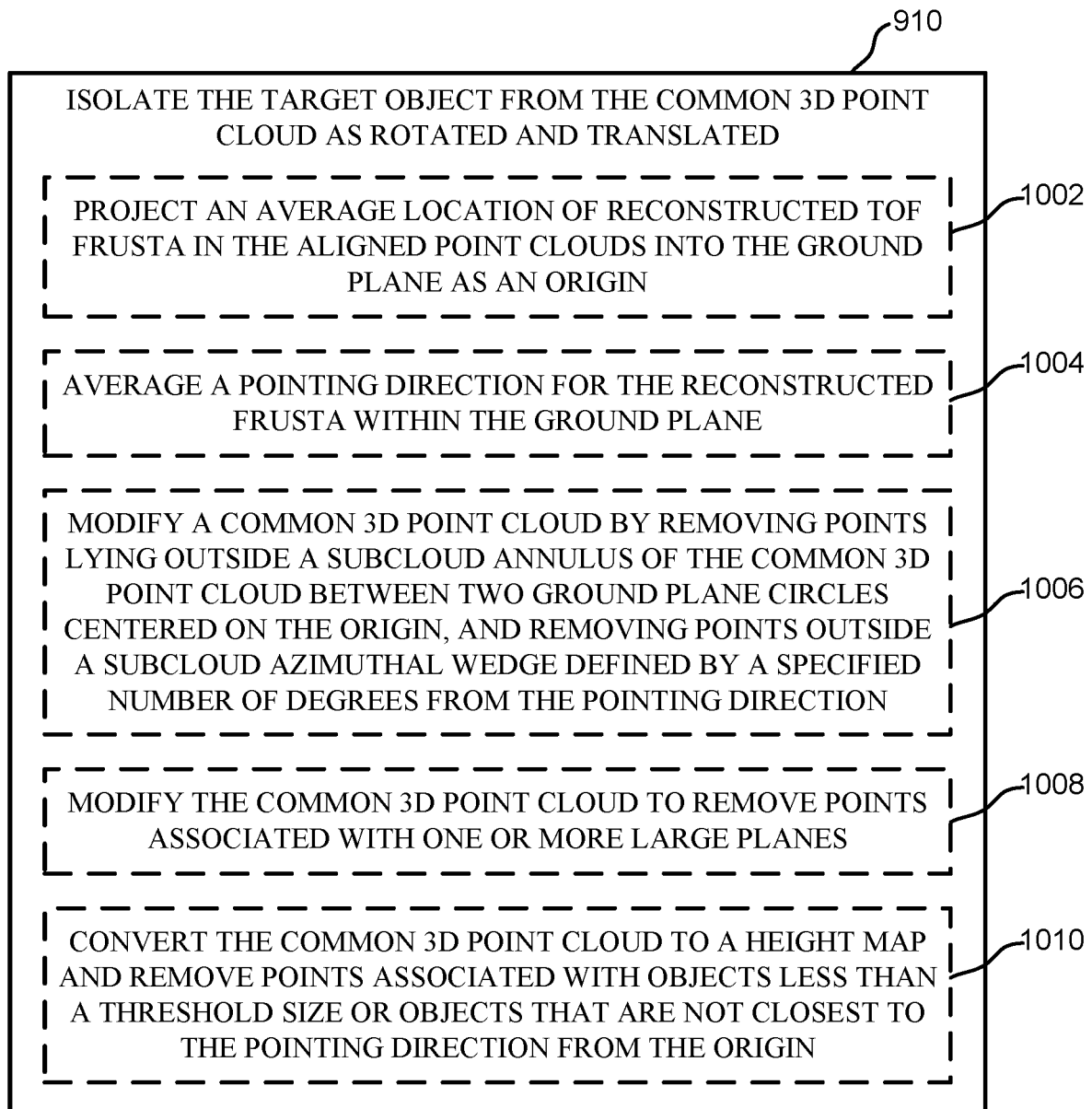

910

ISOLATE THE TARGET OBJECT FROM THE COMMON 3D POINT CLOUD AS ROTATED AND TRANSLATED

PROJECT AN AVERAGE LOCATION OF RECONSTRUCTED TOF FRUSTA IN THE ALIGNED POINT CLOUDS INTO THE GROUND PLANE AS AN ORIGIN

1002

AVERAGE A POINTING DIRECTION FOR THE RECONSTRUCTED FRUSTA WITHIN THE GROUND PLANE

1004

MODIFY A COMMON 3D POINT CLOUD BY REMOVING POINTS LYING OUTSIDE A SUBCLOUD ANNULUS OF THE COMMON 3D POINT CLOUD BETWEEN TWO GROUND PLANE CIRCLES CENTERED ON THE ORIGIN, AND REMOVING POINTS OUTSIDE A SUBCLOUD AZIMUTHAL WEDGE DEFINED BY A SPECIFIED NUMBER OF DEGREES FROM THE POINTING DIRECTION

1006

MODIFY THE COMMON 3D POINT CLOUD TO REMOVE POINTS ASSOCIATED WITH ONE OR MORE LARGE PLANES

1008

CONVERT THE COMMON 3D POINT CLOUD TO A HEIGHT MAP AND REMOVE POINTS ASSOCIATED WITH OBJECTS LESS THAN A THRESHOLD SIZE OR OBJECTS THAT ARE NOT CLOSEST TO THE POINTING DIRECTION FROM THE ORIGIN

METHODS AND SYSTEMS FOR PERFORMING OBJECT DIMENSIONING

CLAIM OF PRIORITY UNDER 35 U.S.C. § 119

The present application for patent claims priority to Provisional Patent Application No. 63/324,042, entitled "PALLET DIMENSIONING SYSTEM USING A TIME-OF-FLIGHT CAMERA" filed Mar. 26, 2022, and Provisional Patent Application No. 63/324,043, entitled "OBJECT DIMENSIONING SYSTEM AND ALGO-RITHM" filed Mar. 26, 2022, which are assigned to the assignee hereof and hereby expressly incorporated by reference herein for all purposes.

BACKGROUND

In shipping, storage, or moving industries, companies often provide pricing based on a size of an item or items to be shipped, stored, or moved. Manually measuring sizes of each of multiple items, such as by using a tape measure or other measuring mechanism, can be time consuming and/or can be inaccurate. In addition, some items may not be box-shaped or otherwise symmetrical, which can add complexity to measuring such items.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Aspects of the present disclosure include a method for isolating a target scene object from multiple images of a time-of-flight (TOF) sensor. The method includes transforming the multiple images from a TOF sensor into multiple three-dimensional (3D) point clouds, identifying, in each of the multiple 3D point clouds, one or more large planes having a minimal threshold size, generating a common 3D point cloud by aligning rotated and translated point clouds corresponding to at least a portion of the multiple 3D point clouds, rotating and translating the common 3D point cloud to have one of one or more large planes identified as a ground plane within a common coordinate system of the common 3D point cloud, and isolating a target object from the common 3D point cloud as rotated and translated.

In another aspect, a system is provided that includes a memory, and a processor coupled to the memory. The processor is configured to transform the multiple images from a TOF sensor into multiple 3D point clouds, identify, in each of the multiple 3D point clouds, one or more large planes having a minimal threshold size, generate a common 3D point cloud by aligning rotated and translated point clouds corresponding to at least a portion of the multiple 3D point clouds, rotate and translate the common 3D point cloud to have one of one or more large planes identified as a ground plane within a common coordinate system of the common 3D point cloud, and isolate a target object from the common 3D point cloud as rotated and translated.

In another aspect, a computer-readable medium including code executable by one or more processors for isolating a target scene object from multiple images of a TOF sensor is provided. The code includes code for transforming the multiple images from a TOF sensor into multiple 3D point clouds, identifying, in each of the multiple 3D point clouds, one or more large planes having a minimal threshold size, generating a common 3D point cloud by aligning rotated and translated point clouds corresponding to at least a portion of the multiple 3D point clouds, rotating and translating the common 3D point cloud to have one of one or more large planes identified as a ground plane within a common coordinate system of the common 3D point cloud, and isolating a target object from the common 3D point cloud as rotated and translated.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 6 illustrates an example of a method for associating point clouds from different poses of capture for performing object dimensioning in accordance with aspects described herein.

FIG. 8 illustrates an example of point clouds and corresponding feature spaces, as well as point clouds and a graph representation of tiepoint consistency in accordance with aspects described herein.

FIG. 9 illustrates an example of a method for isolating a target object in multiple TOF images for performing dimensioning thereof in accordance with aspects described herein.

FIG. 10 illustrates an example of a method for isolating the target object from the common three-dimensional (3D) point cloud as rotated and translated in accordance with aspects described herein.

DETAILED DESCRIPTION

Figure 1:
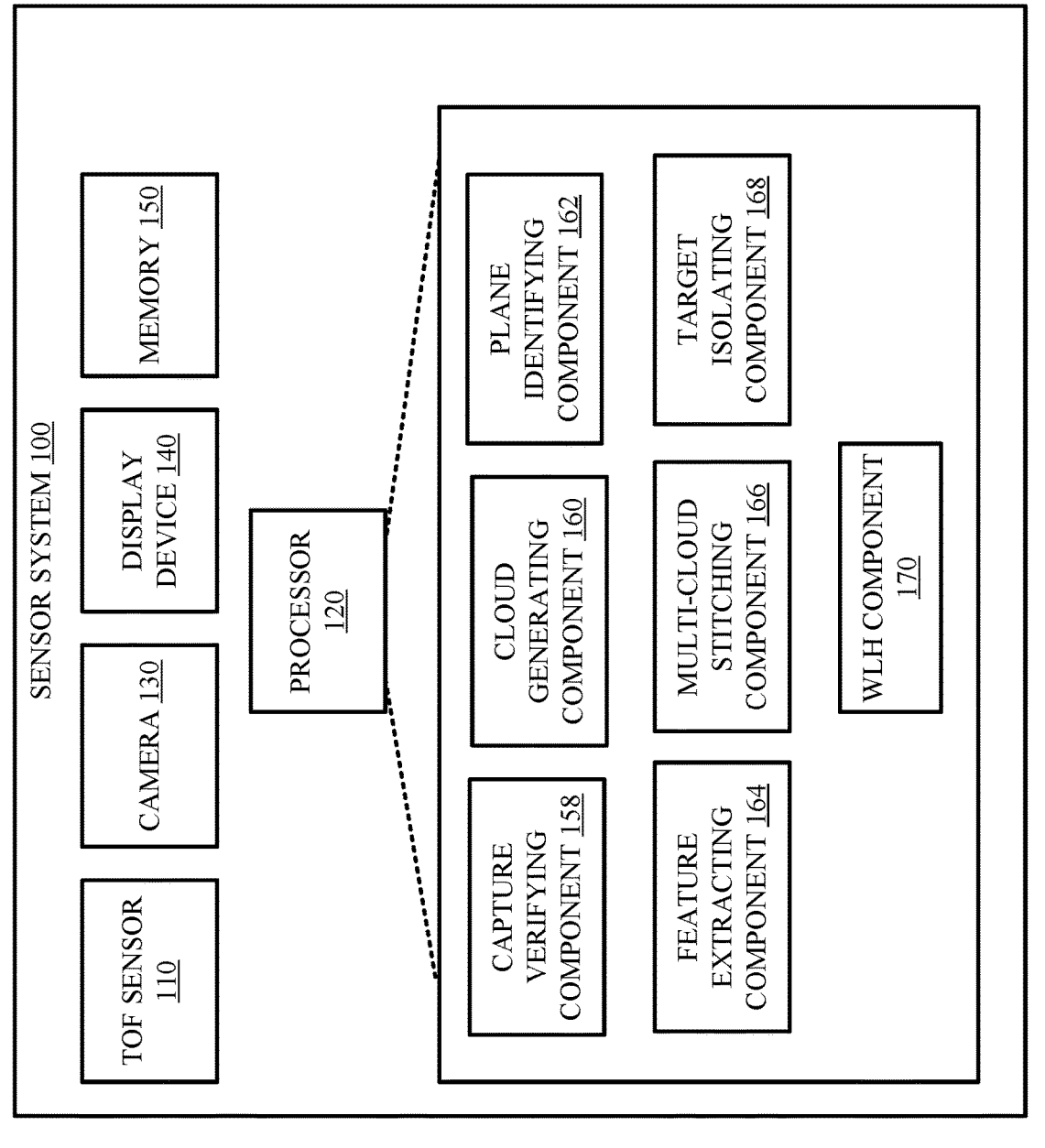
FIG. 1 is a block diagram of an example sensor system in accordance with aspects described herein.

Various aspects are now described with reference to the drawings. In the following description, for purposes of explanation, numerous specific details are set forth in order to provide a thorough understanding of one or more aspects.

It may be evident, however, that such aspect(s) may be practiced without these specific details.

The described features generally relate to an object dimensioning system, method, and/or algorithm for measuring dimensions of an object observed using a time-of-flight (TOF) sensor or other camera, such as a depth camera, or sensor. In an example, the described features can enable measurement of irregularly shaped objects, which can include determining a width, length, height (WLH) and accordingly fitting a bounding box around an irregularly shaped (or asymmetrical) object. For example, the TOF sensor can be used to capture 3D images (e.g., TOF images) of an object from various poses around the object to allow for determining the object dimensions. For example, a pose can relate to the position of the TOF sensor relative to an object (e.g., around the object), the angle of the TOF sensor relative to the object (e.g., a tilt of the TOF sensor), other orientation parameters, and/or the like, which may also be more generally referred to herein as a position. The 3D images can be aligned in a common coordinate system (which can also be referred to as "stitching") by finding point correspondences between the 3D images. In one example, a larger 3D image that combines the views of the objects at the various poses can be generated. One or more objects can be located in, and/or based on, the points in the common coordinate system. In addition, for example, the size of the object (e.g., WLH) can be computed in the common coordinate system. In some examples, a representation of the object can be displayed, which can also include one or more measurements of the object (e.g., WLH).

In this regard, for example, the system, method, and/or algorithm for performing object dimensioning, as described herein, can provide object dimensions based on a number of captures using the TOF sensor, which can allow for efficient and substantially accurate measurement of objects, regardless of shape. This can allow for determining size of objects to be shipped, stored, moved, etc. to enable more accurate pricing or other logistics considerations.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y.

FIG. 1 is a block diagram of an example sensor system 100 in accordance with aspects described herein. The sensor system 100 includes a TOF sensor 110, a processor 120, a camera 130, a display device 140, and a memory 150. In alternative configurations, different, fewer, and/or additional components may be included in the TOF sensor system from those shown in FIG. 1. Furthermore, the functionality described in conjunction with one or more of the components shown in FIG. 1 may be distributed among the components in a different manner than described. In some embodiments, some or all of the components 110-150 may be integrated into a single unit, e.g., a handheld unit having a TOF sensor 110, a processor 120 for processing the TOF data, a local memory 150, and a display device 140 for displaying an output of the processor 120 to a user. In some embodiments, some components may be located in different devices, e.g., a handheld TOF sensor 110 may transmit TOF data to an external processing system (e.g., a computer or tablet) that stores and processes the TOF data and provides one or more displays to a user. Different devices may communicate over wireless or wired connections.

The TOF sensor 110 collects distance data describing a distance between the TOF sensor 110 and various surfaces in the environment of the TOF sensor 110. The TOF sensor 110 may contain a light source, e.g., a laser, and an image sensor for capturing light reflected off the surfaces. In some embodiments, the TOF sensor 110 emits a pulse of light and capture multiple image frames at different times to determine an amount of time for the light pulse to travel to the surface and be returned to the image sensor. In other embodiments, the TOF sensor 110 detects phase shifts in the captured light, and the phase shifts indicate the distance between the TOF sensor 110 and various surfaces. In some embodiments, the TOF sensor 110 may generate and capture light at multiple different frequencies. If the TOF sensor 110 emits and captures light at multiple frequencies, this can help resolve ambiguous distances and help the TOF sensor 110 work at larger distance ranges. For example, if, for a first frequency, a first observed phase may correspond to a surface 0.5 meters, 1.5 meters, or 2.5 meters away, and, for a second frequency, a second observed phase may correspond to a surface 0.75 meters, 1.5 meters, or 2.25 meters away, by combining the two observations, the TOF sensor 110 can determine that the surface is 1.5 meters away. Using multiple frequencies may also improve robustness against noise caused by particular frequencies of ambient light, whether phase shift or pulse return time are used to measure distance. In alternate embodiments, different types of sensors may be used instead of and/or in addition to the TOF sensor 110 to obtain distance data.

The processor 120 receives distance data from the TOF sensor 110 and processes the distance data to identify various features in the environment of the TOF sensor 110, as described in detail herein, e.g., with respect to FIGS. 3-8. In some embodiments, the distance data includes the observed distances to various surfaces measured by the TOF sensor 110 using, e.g., the phase shift or pulse return time methods described above. In some embodiments, if the TOF sensor 110 measures phase shifts, the distance data received by the processor 120 from the TOF sensor 110 is the phase shift data, and the processor 120 calculates the distances to the surfaces from the phase shift data.

A camera 130 may capture image frames of the environment. The camera 130 may be a visual light camera that captures images of the environment in the visible range. In other embodiments, the camera 130 is an infrared (IR) camera captures IR intensities of the surfaces in the sensor system's environment. The field of view of the camera 130 and TOF sensor 110 are partially or fully overlapping, e.g., the field of view of the camera 130 may be slightly larger than the field of view of the TOF sensor 110. The camera 130 may pass captured images to the processor 120.

The display device 140 provides visual output for a user of the sensor system 100. In some embodiments, the display device 140 displays an image obtained by the camera 130 and overlays visual imagery indicating one or more features identified in the field of view of the camera 130 and TOF sensor 110 based on the distance data. For example, the processor 120 may instruct the display device 140 to display an outline of a box over an image of the box obtained by the camera 130. A user can use this display to determine whether the sensor system 100 has correctly identified the box and the box's edges. The sensor system 100 may include additional or alternative input and/or output devices, e.g., buttons, a speaker, a touchscreen, etc.

The memory 150 stores data for the sensor system 100. For example, the memory 150 stores processing instructions used by the processor 120 to identify features in the environment of the TOF sensor 110, e.g., instructions to identify one or more Z-planes and/or to calculate dimensions of an observed object. The memory 150 may temporarily store data and images obtained by the camera 130 and/or TOF sensor 110 and accessed by the processor 120. The memory 150 may further store image data accessed by the display device 140 to generate an output display.

Figure 2:
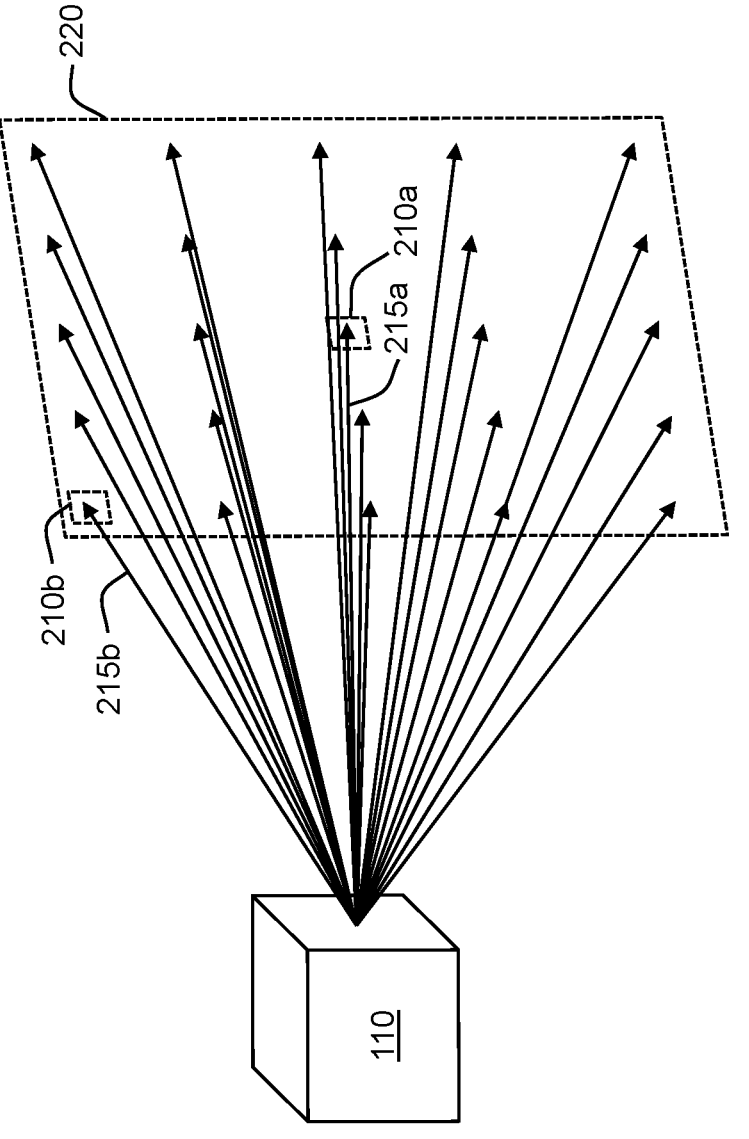
FIG. 2 illustrates ray directions of pixels of the time-of-flight (TOF) sensor in accordance with aspects described herein.

FIG. 2 illustrates ray directions of pixels of the TOF sensor 110 in accordance with aspects described herein. The distance data obtained by the TOF sensor 110 may be arranged as a set of pixels, e.g., the pixels 210a and 210b, within an image frame, e.g., the image frame 220. Each pixel 210 has an associated ray direction 215, where the ray direction 215 points outwards from the TOF sensor 110. The ray directions 215 are projected towards the image frame 220. While 25 rays and pixels are shown in FIG. 2, it should be understood that the TOF sensor 110 may have many more pixels. While the image frame 220 has a square shape in the example shown in FIG. 2, the image frame 220 may have other shapes in other embodiments. In some examples, certain pixels, e.g., pixels near the edge of the image frame 220, may not be considered valid (e.g., not sufficiently reliable), and are removed from the distance data.

For example, a first pixel 210a has a ray direction 215a that extends straight out from the TOF sensor 110; the pixel 210a is in the center of the image frame 220. A second pixel 210b at a corner of the image frame 220 is associated with a ray direction 215b that extends out from the TOF sensor 110 at, for example, a 30° angle in both an x-direction and y-direction from the center of the image frame 220, where the image frame 220 is an x-y plane in a frame of reference of the TOF sensor 110. The TOF sensor 110 returns distance data (e.g., a distance, one or more phase shifts) to a surface along each valid pixel's ray. In one example, the first pixel 210a may have a measured distance of 1 meter representing a distance to a particular point on a target object, and the second pixel 210b may have a measured distance of 2 meters representing a distance to particular point on a wall behind the target object.

Returning to FIG. 1, processor 120 can include, implement, or execute various components or processes for performing object dimensioning, as described herein. For example, processor 120 can implement or execute components or processes based on corresponding instructions, related parameters, etc. stored in memory 150. In some examples, processor 120 can include, implement, or execute a capture verifying component 158 for verifying that images received from the TOF sensor 110 are taken at desired poses for performing object dimensioning, a cloud generating component 160 for generating a 3D point cloud based on an image capture from the TOF sensor 110, a plane identifying component 162 for identifying large planes in the 3D point cloud, a feature extracting component 164 for determining features associated with points in the 3D point cloud, a multi-cloud stitching component 166 for associating multiple 3D point clouds with one another in a common coordinate system based on detecting corresponding points in the 3D point clouds, a target isolating component 168 for isolating one or more target objects detected in the common coordinate system, and/or a WLH component 170 for computing a bounding box around the target object and/or computing or otherwise displaying a representation of WLH measurements, or other measurements, associated with the target object.

In some examples, the TOF sensor 110 can capture multiple images of an environment having one or more objects. For example, the TOF sensor 110 can be used to capture views of multiple images (e.g., image pairs) at each of multiple positions around the one or more objects, where each view pair can include two (or more) images captured by the TOF sensor 110 at a given pose. Collecting pairs of images in back-to-back TOF frames can provide improved signal-to-noise ratio (SNR) for the pair of images to allow for robust stitching of the corresponding point cloud, as described further herein. For example, if an object being captured is dark in color or shiny, not enough photons transmitted by the TOF sensor 110 towards the object may return back to the TOF sensor 110 to be observed by the receiver of the TOF sensor 110. As such, collecting multiple TOF frames at each pose can increase the number of returned photons to yield a more dense aggregated point cloud at the position. The images can also include, or be referred to as, range maps, depth maps, or depth images. In some examples, the TOF sensor 110 can additionally or alternatively capture an infrared (IR) image with a depth image, where the IR image can assist further post processing of the view to discard noisy data.

In some examples, the TOF sensor 110 can be used to capture the view pairs at a certain number of poses (e.g., positions of the TOF sensor 110 relative to an object, viewing angles of the TOF sensor 110 at the positions, or other orientations, etc. of capture) that are at substantially the same azimuth around the one or more objects to capture a specific azimuthal range around the one or more objects, such as a total of 90 degrees. In one specific example, the TOF sensor 110 can be used to capture four view pairs at each of four positions spaced substantially at 30 degrees azimuth from one another. The TOF sensor 110 can provide the view pairs and/or parameters corresponding to the TOF sensor 110 to the processor 120. In some examples, the capture verifying component 158 can validate or otherwise ensure the view pairs are captured at desired positions for effective object dimensioning, as described further herein.

In some examples, cloud generating component 160 can receive the view pairs from the TOF sensor 110 and can generate 3D point clouds for each view pair (e.g., for each position). For examples, cloud generating component 160 can generate an aggregated 3D point cloud for a given position based on the multiple views in the view pair, as described, and/or may generate a separate point cloud for each position. In some examples, plane identifying component 162 can identify large planes in each of the multiple 3D point clouds as collections of adjacent points having a same surface normal, where a large plane can be determined as having a minimum threshold size (e.g., a minimum threshold number of points having the same surface normal). In some examples, feature extracting component 164 can determine or compute features associated with each point in a given 3D point cloud. For example, feature extracting component 164 can generate a point feature histogram (PFH) or fast PFH (FPFH) that describes each point in the 3D point cloud. In some examples, multi-cloud stitching component 166 can, based on the determined features for the points of multiple 3D point clouds, associate points in the multiple 3D point clouds as having a point correspondence (e.g., as being the same real world point captured at different poses). This can allow the multi-cloud stitching component 166 to create a more complete image (e.g., point cloud) of the environment in a common coordinate system, as described in further detail and various examples herein, which can facilitate improved measurement of the WLH dimensions of one or more objects.

In some examples, the target isolating component 168 can detect one or more target objects in the common coordinate system point-cloud created by the multi-cloud stitching component 166, which may be based on detecting a size of the target object in the common coordinate system as being of at least a threshold size. In some examples, WLH component 170 can fit a bounding box around the target object based on identifying the points in the common coordinate system point cloud that correspond to the target object. In some examples, WLH component 170 can compute or otherwise display, e.g., via display device 140, an indication of the WLH of the target object, which may include displaying the actual WLH dimensions measured of the target object (e.g., the dimensions of the bounding box), displaying the bounding box, etc. In an example, WLH component 170 can also display a representation of the environment or target object, as observed at a current position, or a representation of the common coordinate system point cloud, etc. In some examples, WLH component 170 can display the WLH measurements, bounding box, etc. on the representation of the environment or target object or common coordinate system point cloud, as described in various examples herein.

Figure 3:
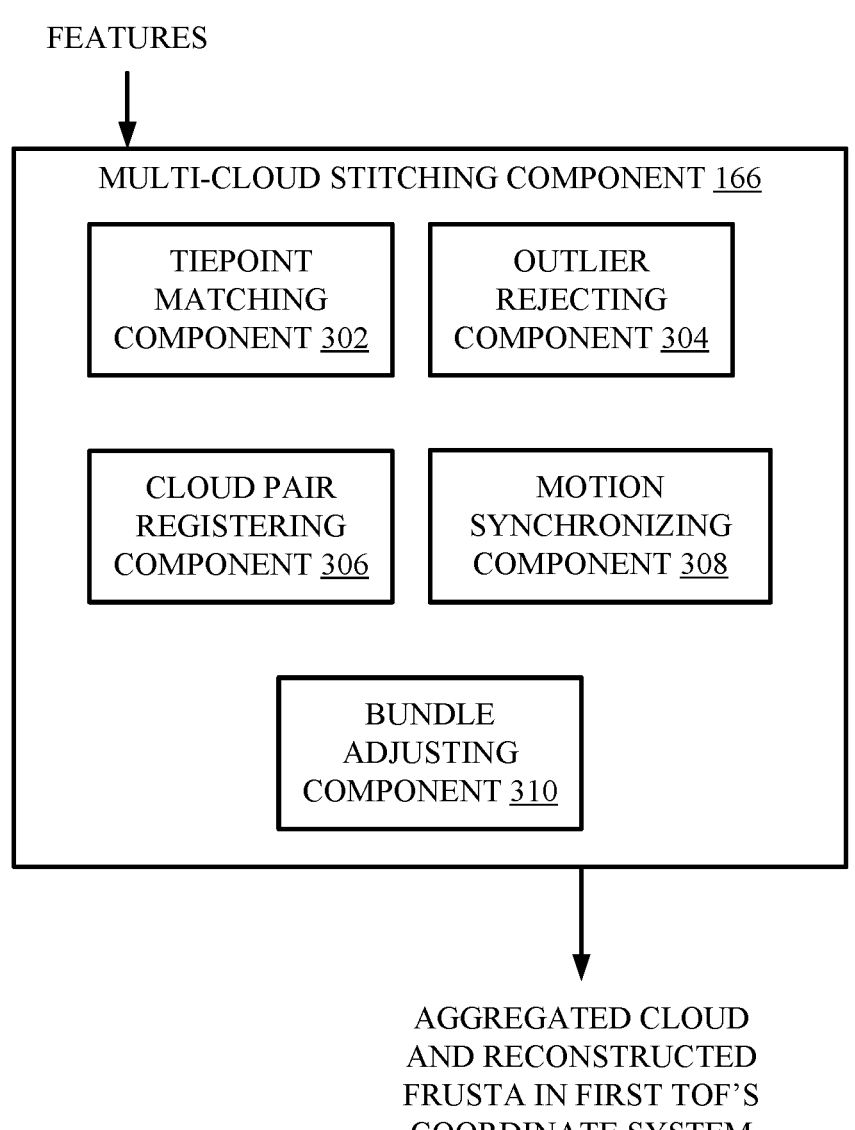
FIG. 3 illustrates an example of a multi-cloud stitching component in accordance with aspects described herein.

FIG. 3 illustrates an example of a multi-cloud stitching component 166 in accordance with aspects described herein. The multi-cloud stitching component 166 can include a tiepoint matching component 302 that can receive features, such as FPFH descriptors, for multiple 3D point clouds (e.g., from feature extracting component 164). The tiepoint matching component 302 can perform a first pass tiepoint matching process to determine pairs of points in at least two point clouds that have a point correspondence. For example, the tiepoint matching component 302 can determine the pairs of points as having point descriptors that are within a threshold (e.g., have values within a threshold of one another), which may indicate that the points correspond to the same real world point captured in the images. In some examples described further herein, outlier rejecting component 304 can perform one or more processes to refine the points matched by tiepoint matching component 302 to remove outliers and expedite associated processing of the point clouds for object dimensioning. Given the reduced set of corresponding points, cloud pair registering component 306 can derive rotation and translation of point clouds based on the detected tiepoints. In some examples, motion synchronizing component 308 can calculate an absolute TOF pose, which may be specified in a coordinate system associated with a first TOF image, and bundle adjusting component 310 can vary the TOF rotations and translations and reconstructed points to decrease errors in the dimensioning process. The multi-cloud stitching component 166 can output an aggregated cloud and reconstructed frusta in the first TOF's coordinate system, which can be used by target isolating component 168 to isolate a target object in the images for performing dimensioning thereof, as described in further detail herein.

Figure 4:
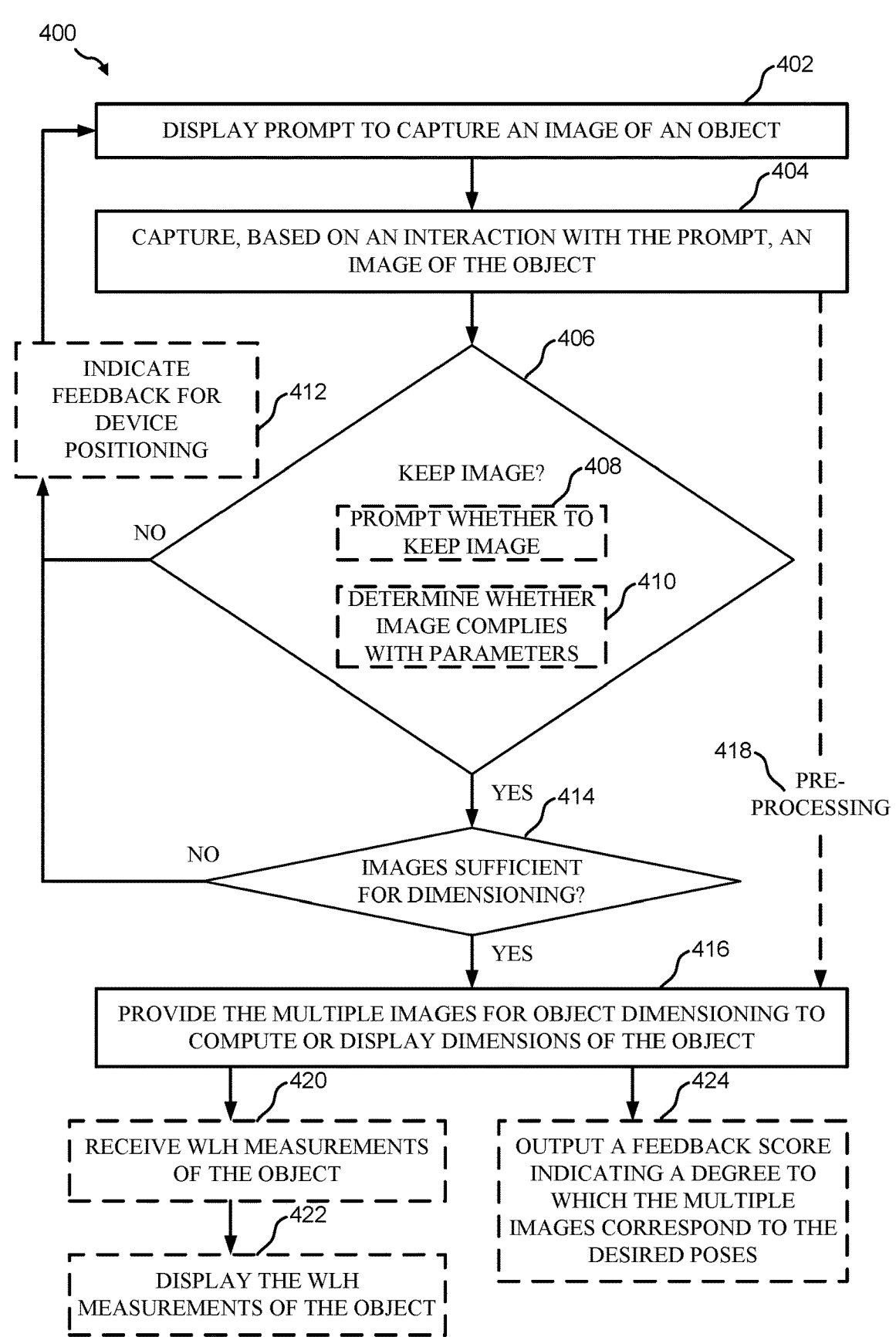
FIG. 4 illustrates an example of a method for validating TOF images for performing object dimensioning in accordance with aspects described herein.

FIG. 4 illustrates an example of a method 400 for validating TOF images for performing object dimensioning in accordance with aspects described herein. The method 400 may be performed by a sensor system 100, one or more components thereof, such as a TOF sensor 110, processor 120, etc.

The method 400 can include, at 402, displaying a prompt to capture an image of an object. For example, display device 140, e.g., in conjunction with processor 120, memory 150, etc., can display the prompt to capture the image of the object. Display device 140 can display the prompt as part of activating, initializing, or powering on the sensor system 100, executing an application for image capture and/or object dimensioning, etc. Processor 120 can cause the prompt to be displayed as an interface on the display device 140 (e.g., a graphical user interface, which may be part of the application executing on processor 120). The prompt can display a live camera view of the environment as the sensor system 100 is moved around the environment, and the live camera view can be a TOF sensor 110 view, which may be represented as an infrared (IR) image, etc. The prompt can also include an interactable option to capture an image.

The method 400 can include, at 404, capturing, based on an interaction with the prompt, an image of the object. For example, processor 120, or the corresponding application executing on the processor 120, can detect, e.g., via display device (as a touch screen display) or other input device, the interaction with the prompt to select the interactable option to capture the image from the TOF sensor 110, in conjunction with memory 150, etc. In addition, as described in some examples, processor 120 can capture multiple images from the TOF sensor 110 based on interaction with the prompt, such as two (or more) images in a view pair. In an example, the number of images to capture and/or the time between image captures when detecting interaction with the prompt can be configurable to optimize image quality for object dimensioning.

In this regard, multiple discrete images can be captured, as opposed to a continuous video capture. Capturing the multiple discrete images can be easier to accurately capture, as opposed to continuous video. For example, continuous video may introduce challenges of holding the system steady, performing continuous motion of the system to capture the correct views over a certain period of time, etc. Using discrete images can allow the user time to properly align the TOF sensor 110 before capturing the image(s) to be processed.

After the image is captured at 404, the method 400 can include, at 406, determining whether to keep the image. For example, capture verifying component 158, e.g., in conjunction with processor 120, memory 150, etc., can determine whether to keep the image. For example, determining whether to keep the image can include one or more various actions performed by a user of the sensor system 100 or performed automatically by the sensor system to ensure images that can assist in object dimensioning are captured and provided for further processing.

In one example, determining whether to keep the image at 406 can optionally include, at 408, prompting whether to keep the image. For example, capture verifying component 158, e.g., in conjunction with processor 120, memory 150, etc., can display, via display device 140, a prompt of whether to keep the image, which can be displayed after each image capture, after capturing a number of images, etc. Based on interaction with the prompt, capture verifying component 158 can determine whether to keep the image.

In another example, determining whether to keep the image at 406 can optionally also (or alternatively) include, at 410, determining whether the image complies with parameters for effective object dimensioning. For example, capture verifying component 158, e.g., in conjunction with processor 120, memory 150, etc., can determine whether the image complies with parameters for effective object dimensioning. In some examples, capture verifying component 158 can ensure that a view pair has enough distinction to provide at least a threshold improvement in SNR for the view pair over a single one of the views. In another example, capture verifying component 158 can ensure that an object is discernable in the image, e.g., that an object has a large enough number of associated points in a point cloud to facilitate identification and accurate measurement of the object from the image. For example, the size of the object in the picture can be configurable, and capture verifying component 158 may detect whether the image includes an object of at least the configured size in determining whether to keep the image.

If it is determined not to keep the image at 406, the method can proceed to 402 to display another prompt for capturing an image. The method 400 can optionally include, at 412, indicating feedback for device positioning. For example, capture verifying component 158, e.g., in conjunction with processor 120, memory 150, etc., can indicate, e.g., via display device 140 or other output device, feedback for device positioning, such as a haptic feedback via a haptic feedback device on the sensor system 100, audio or visual feedback via display device 140, etc. In this regard, for example, the sensor system 100 can assist a user in capturing images at positions/orientations that can yield effective object dimensioning, as described further herein. In some examples, the sensor system 100 can include one or more sensors to enable position determination, such as an accelerometer, a compass, or other displacement or position sensors, which can provide position information for the sensor system 100. In another example, the environment within which the sensor system 100 is capturing images can include external sensors, such as a TOF scanner, a camera that can detect presence and position of the sensor system 100, etc. In either case, such internal or external sensors can be used to detect the position of the TOF sensor 110 for the purpose of determining whether a captured image is at a desired position/orientation and/or for guiding the user through feedback in real time to properly position the TOF sensor 110 for capturing the image.

For example, the capture verifying component 158 can obtain position information for the sensor system 100, or at least the TOF sensor 110 thereof, and can determine whether the TOF sensor 110 is in a position for capturing a next image for object dimensioning (e.g., determine whether the TOF sensor 110 is in a position that is within a certain azimuth of a position at which a previous image is captured). In this example, capture verifying component 158 can provide feedback via the display device 140 of whether the sensor system 100, or at least the TOF sensor 110, is at the correct (or an acceptable) position/orientation for capturing the next image or not. In one example, based on the current detected position/orientation of the sensor system 100, or at least the TOF sensor 110, and a known desired position/ orientation for the next image capture, capture verifying component 158 can provide feedback to guide a user of the sensor system 100 to the desired or acceptable position. For example, capture verifying component 158 can provide the feedback as an arrow displayed on the display device 140 indicating a direction to move the sensor system 100 to be at the desired position, a box or other indicator displayed on the display device 140 showing where to align a center of the display device 140, etc. In one example, capture verifying component 158 can indicate when the sensor system 100 is in a desired or acceptable position for capturing the next image, such as by displaying an icon or pop-up message, activating a selectable option to capture the image, etc.

If it is determined to keep the image at 406, the method 400 can include, at 414, determining whether the images are sufficient for object dimensioning. For example, capture verifying component 158, e.g., in conjunction with processor 120, memory 150, etc., can determine whether the images are sufficient for object dimensioning. In some examples, capture verifying component 158 can determine whether there are enough images for object dimensioning. In some examples, capture verifying component 158 can determine whether the images are taken at desired positions/ orientations around the object to allow for object dimensioning, as described below with reference to method 500 of FIG. 5 (e.g., as part of validating whether the multiple images are taken at desired positions/orientations at 504).

If it is determined that the images are not sufficient for dimensioning at 414, method 400 can process back to 402 to display the prompt to capture an image of the object. In some examples, as described above at 412, feedback can be indicated for device positioning to assist in capturing an image that is useful for dimensioning. For example, where capture verifying component 158 determines that a given image is insufficient for dimensioning, capture verifying component 158 can indicate feedback to retake that image, which can include an indication of the image to be retake. For example, the indication can include displaying the image to be retaken, indicating an index of the image in the set of multiple images to be retaken, indicating a position of the device for taking the image (e.g., displaying arrows to guide to the desired position for the image to be retaken), etc. In another example, capture verifying component 158 can discard all images and display the prompt to start with the initial capture.

If it is determined that the images are not sufficient for dimensioning at 414, method 400 can include, at 416, providing the multiple images for object dimensioning to compute or display dimensions of the object. For example, capture verifying component 158, e.g., in conjunction with processor 120, memory 150, etc., can provide the multiple images (e.g., to cloud generating component 160 or one or more other components) for object dimensioning to compute or display dimensions of the object. In one example, capture verifying component 158 can display a prompt on the display device 140 to perform object dimensioning, where verifying component 158 can display the prompt based on validating that object dimensioning can be performed using the images captured for the object. As described, this can include a number of images captured, a SNR of the images, an angle of capture with respect to an object, etc.

In addition, in some examples, after capturing an image, pre-processing can be used at 418 to provide the captured image for object dimensioning while waiting for additional images to be captured. This can allow for starting processing of the image and/or other images for object dimensioning while awaiting capture of other images. For example, as described further herein, the object dimensioning actions can take some time to perform, and pre-processing in this regard can allow for some computation actions to be performed (e.g., point cloud generating, plane identification, feature extracting, multi-cloud stitching, etc.) as images are being captured, which can reduce overall processing time once all images are captured. In this regard, the processing time perceived by the user between the time of indicating object dimensioning to be performed and receiving an output of object dimensioning can be decreased by performing the pre-processing at 418.

The method 400 can optionally include, at 420, receiving WLH measurements of the object. For example, WLH component 170, e.g., in conjunction with processor 120, memory 150, etc., can receive or otherwise determine WLH measurements of the object based on other components performing object dimensioning, as described further herein. The method 400 can optionally include, at 422, displaying the WLH measurements of the object. For example, display device 140, e.g., in conjunction with processor 120, memory 150, etc., can display the WLH measurements of the object. For example, as described further herein, this can include displaying the measurement numbers, displaying a bounding box around a display of the object, etc.

In some examples, method 400 can optionally include, at 424, outputting a feedback score indicating a degree to which the multiple images correspond to the desired poses. For example, capture verifying component 158, e.g., in conjunction with processor 120, memory 150, etc., can output the feedback score indicating the degree to which the multiple images correspond to the desired poses. Thus, as described above and further herein, feedback can be provided during image capture (e.g., at 412) or after capturing (e.g., at 424). For example, in this regard, the feedback can be per image (or per the presently captured images) or for the set of images based further processing of the images or attempts to perform association (or stitching), as described further herein.

In an example, capture verifying component 158 can receive, from one or more other components of the object dimensioning system (such as multi-cloud stitching component 166) an indication of a feedback score for the images, as used in object dimensioning. The feedback score can relate to how close the images are to the desired azimuth. In one example, this can be based on a distance to center of certain points in the corresponding point clouds having point correspondence with points in other point clouds. The feedback score can be based on other measurements of the images, such as SNR, etc. The feedback score can indicate a sufficiency or quality of the set of images, and/or can be selected from a set of labels or can be numeric or alphabet based.

Figure 5:
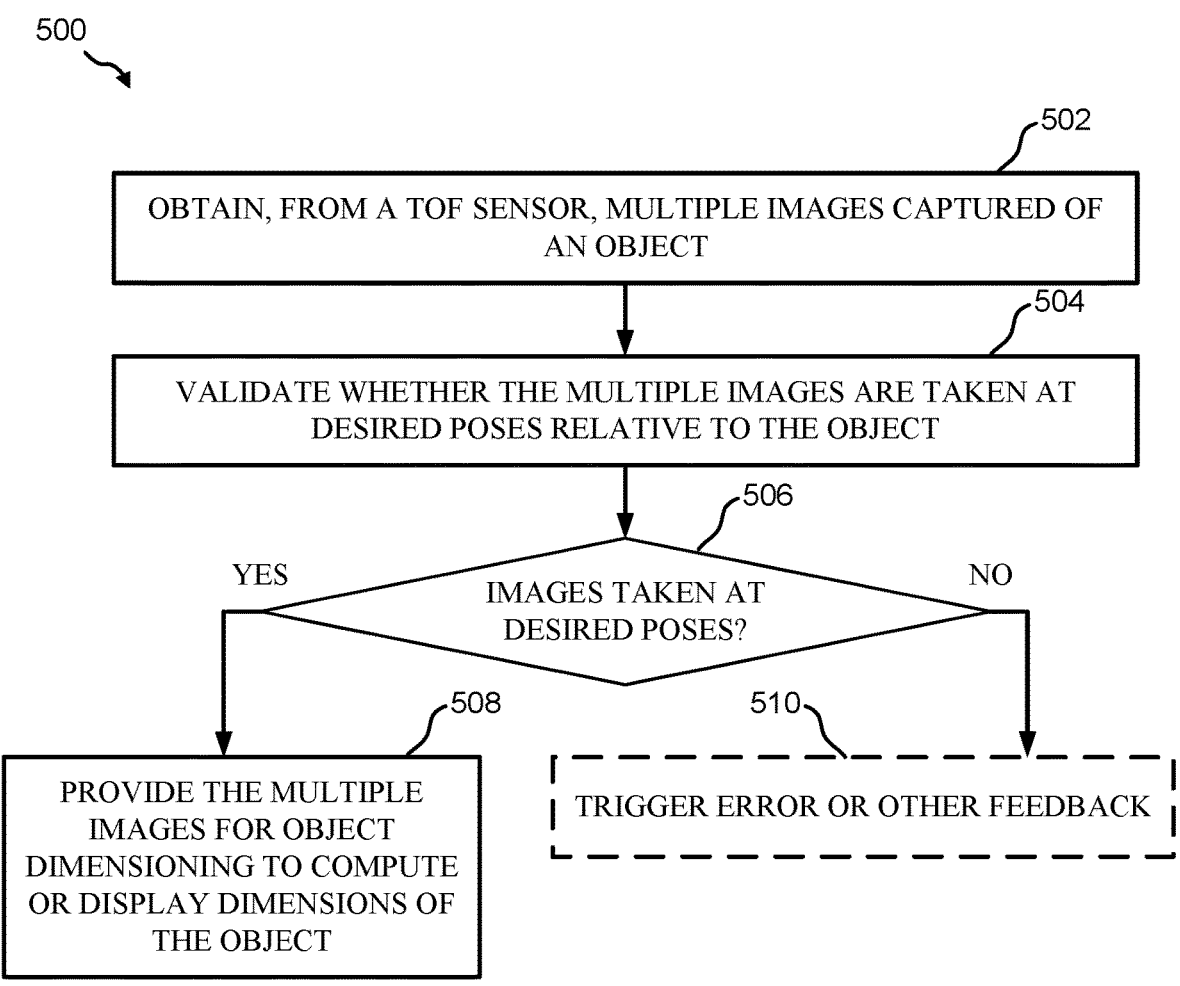
FIG. 5 illustrates an example of a method for obtaining TOF images for performing object dimensioning in accordance with aspects described herein.

FIG. 5 illustrates an example of a method 500 for obtaining TOF images for performing object dimensioning in accordance with aspects described herein. The method 500 may be performed by a sensor system 100, one or more components thereof, such as a TOF sensor 110, processor 120, etc.

The method 500 can include, at 502, obtaining, from a TOF sensor, multiple images including an object. For example, capture verifying component 158, e.g., in conjunction with processor 120, memory 150, etc., can obtain, from the TOF sensor 110, the multiple images including the object. For example, the TOF sensor 110 can perform the multiple captures, as described above, which may include capturing view pairs at each of multiple positions/orientations around the object. In some examples, the TOF sensor 110 can be operated by a user or another device to capture views around an azimuthal range of the object, as described, which may include capturing view pairs at a number of positions around the azimuthal range. In addition, in some examples, the positions may be within an azimuthal range of one another. In one specific example, the TOF sensor 110 can capture view pairs at each of four positions within substantially a 30 degree azimuthal range of one another to capture a total azimuthal range of substantially 90 degrees around the object.

The method 500 can include, at 504, validating whether the multiple images are taken at desired positions relative to the object. For example, capture verifying component 158, e.g., in conjunction with processor 120, memory 150, etc., can validate (e.g., before or as part of generating associated 3D point clouds) whether the multiple images are taken at desired positions relative to the object. In some examples, capture verifying component 158 can validate whether the multiple images are taken at desired positions/orientations based on information indicated in or along with the image as received from the TOF sensor 110. For example, the TOF sensor 110 can indicate accelerometer, compass, or other displacement/position sensor measurements of the TOF sensor 110 at the time of capturing the views (or view pairs) at each position, and the capture verifying component 158 can determine whether the measurements indicate that the views are at the desired position. For example, the capture verifying component 158 can compare the measurements to one another, compare a difference of the measurements to a threshold, compare the measurements to a threshold, etc. in validating whether the multiple images are taken at desired positions (e.g., taken substantially at a certain azimuth or range of azimuth within one another, as described).

In some examples, other external sensors within the environment, such as a TOF scanner, a surveillance camera in a room, etc., can be used to track and/or observe location of the TOF sensor 110 when capturing views of the environment. The external sensors can detect the information or measurements of the TOF sensor 110 as it obtains the images, and can provide the information or measurements that the capture verifying component 158 can use to validate whether the images are taken at desired positions. In some examples, capture verifying component 158 can validate the images based on a model of an object detected in the images. For example, capture verifying component 158 can infer the position of the capture for each of the image(s) based on a the position of the object as modeled in each image. In an example, capture verifying component 158 can detect, in each image, the object and an orientation of the object. In this example, capture verifying component 158 can compare the orientations in multiple captures to infer the position information for the image (e.g., the azimuth or difference in azimuth between the captures).

The method 500 can include, at 506, determining whether the images are taken at desired poses. For example, capture verifying component 158, e.g., in conjunction with processor 120, memory 150, etc., can determine whether the images are taken at desired poses (e.g., whether the images are validated at 504). If the result yes, at 508, the multiple images can be provided for object dimensioning to compute or display dimensions of the object, as described further herein. If the result is no, optionally at 510, error or other feedback can be triggered. For example, capture verifying component 158, e.g., in conjunction with processor 120, memory 150, etc., can provide the images (e.g., to cloud generating component 160 or one or more other components) for object dimensioning or can trigger the error or feedback in these cases.

In one example, capture verifying component 158 can trigger the error or feedback as an indication displayed on the display device 140, which can include an indication that object dimensioning cannot be performed, or may include one or more of the feedback indications described above in method 400 at 412 for capturing additional images, etc. For example, where capture verifying component 158 determines that one of the images is not taken at a desired pose, capture verifying component 158 can display, via display device 140, a prompt to retake the image at the desired pose, which can include an indication of the image or pose to recapture, as described above, arrows or other visual or audio (or haptic) feedback to guide the user to properly position the TOF sensor 110 for appropriately capturing the image, etc.

FIG. 6 illustrates an example of a method 600 for associating point clouds from different poses of capture for performing object dimensioning in accordance with aspects described herein. For example, the pose can refer to angle and position of capture (e.g., the rotation and translation as further referred to herein). The method 600 may be performed by a sensor system 100, one or more components thereof, such as a processor 120, etc.

The method 600 can include, at 602, associating a first subset of points within a first 3D point cloud with a second subset of points within a second 3D point cloud based on each point in the first subset of points having a threshold correspondence to a unique counterpart point in the second subset of points. For example, tiepoint matching component 302, e.g., in conjunction with processor 120, memory 150, multi-cloud stitching component 166, etc., can associate the first subset of points within the first 3D point cloud (e.g., of a first TOF view, which may include multiple images) with the second subset of points within the second 3D point cloud (e.g., of a second TOF view, which may include multiple images) based on each point in the first subset of points having the threshold correspondence to the unique counterpart point in the second subset of points. The point and its unique counterpart points can be referred to herein as tiepoints. In an example, given a set of images captured using a TOF sensor 110, as described above, cloud generating component 160 can generate the 3D point clouds for the images, which may include the first 3D point cloud generated for an image (or view pair or other set of multiple images) captured at a first position, the second 3D point cloud generated for an image (or view pair or other set of multiple images) captured at a second position, and/or other point clouds. For example, cloud generating component 160 can generate the point clouds at least in part by multiplying pixels in a TOF range map generated by the TOF sensor 110 during image capture by its corresponding ray direction vector, as described above. The cloud generating component 160 can ignore pixels with invalid range or IR readings, and the resulting point cloud can be in the coordinates of the TOF sensor 110 as captured.

In addition, in some examples, plane identifying component 162 can identify large planes in each of the multiple 3D point clouds. Plane identifying component 162 can identify a ground plane and/or possibly wall planes in the 3D point clouds. In some examples, plane identifying component 162 can compute surface normal for valid pixels in the TOF view and can search for large connected components (e.g., collections of pixels) of nearly constant normal angular coordinates. Random sample consensus (RANSAC) can be performed to fit 3D planes through the connected component regions. For small TOF camera roll angle, ground plane's normal and image plane's vertical direction vector may have large overlap. The dot product of these two can be used to distinguish the ground plan from wall planes in the captured images.

The method 600 can optionally include, at 604, generating a first FPH for points in the first subset of points and a second FPH for points in the second subset of points. For example, feature extracting component 164, e.g., in conjunction with processor 120, memory 150, etc., can generate the first FPH for points in the first subset of points and the second FPH for points in the second subset of points. For example, feature extracting component 164 can generate the PFH as FPFHs or other PFHs that include a geometrical descriptor for each point or collection of points in the point cloud that describes the points. The descriptor can have a number of features or other parameters or values that describe the point and surrounding points, such as how smooth or rough the point and surrounding parts are, an angle or angular measurement represented by the point and surrounding points, etc. For example, the feature extracting component 164 can generate the FPH by, for each of a number, n, of points, looking at pairs of the k-nearest neighboring points, where n and k are positive integers. In this example, feature extracting component 164 can create a local reference frame (e.g., a Darboux frame) between a pair of neighbors, compute an angular variation between the normal vectors with respect to the local reference frame, and put the angular variation of pairs into the histogram.

In an example, the feature extracting component 164 can use FPFH to generate the histograms, which can have 33 values (e.g., each value in the range of 0 and 255) in the descriptor for each point. In some examples, tiepoint matching component 302 can associate the sets of points based on the descriptors received from feature extracting component 164. In an example, tiepoint matching component 302 can attempt to identify, for a given point in the first subset of points, a unique counterpart point in the second subset of points based on comparing the descriptors or corresponding descriptor values of the points. For example, tiepoint matching component 302 can associate points having similar values for the 33 values or a similar aggregated value that represents the 33 values, etc.

Figure 7:
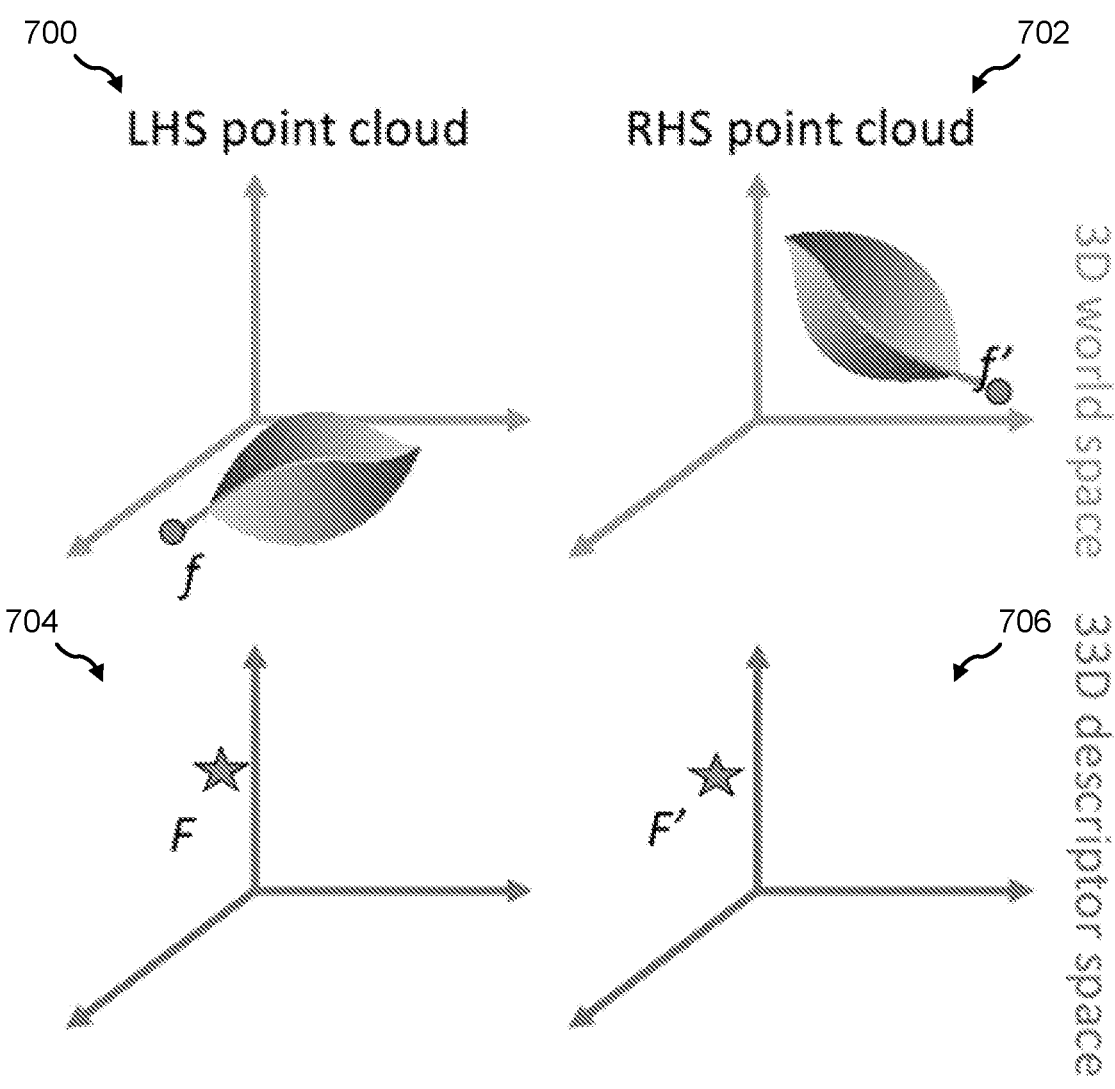
FIG. 7 illustrates an example of point clouds and corresponding feature spaces in accordance with aspects described herein.

FIG. 7 illustrates an example of point clouds 700 and 702 and corresponding descriptor spaces, such as descriptor spaces, 704 and 706 in accordance with aspects described herein. Point cloud 700 can represent one point cloud, called left-hand side (LHS) within the figure, of a leaf captured by a TOF sensor 110 in a 3D world space, and point cloud 702 can represent a second point cloud, called right-hand side (RHS) within the figure, of the same leaf captured by the TOF sensor 110 in the 3D world space from a different position/orientation. Feature extracting component 164 can generate FPFH descriptors for the LHS point cloud 700 and the RHS point cloud 702. As described, in an example, the FPFH descriptor can be a 33D space describing each point. In an example, tiepoint matching component 302 can detect point f in LHS point cloud 700 and point f' in RHS point cloud having similar descriptors, e.g., similar values within the descriptor space, similar descriptor values where the descriptor is a single value representing the various dimensions, etc. In one example, though the point clouds 700 and 702 can have unknown rotations and translations relative to one another, feature extracting component 164 can detect that the descriptors for point f and point f' are within a threshold difference, and this can be considered as possible unique counterpart points in the point clouds 700 and 702. For example, tiepoint matching component 302 can determine that point f 708 corresponds to point F in the 33D descriptor space 704, and that point f' corresponds to a similar point F' in the 33D descriptor space 706, and thus the points f and f' are to be considered as possible unique counterpart points.

Returning to FIG. 6, the method 600 can optionally include, at 606, downsampling a first captured point cloud and a second captured point cloud. For example, cloud generating component 160, e.g., in conjunction with processor 120, memory 150, etc., can downsample the first captured point cloud (e.g., to generate the first 3D point cloud) and the second captured point cloud (e.g., to generate the second 3D point cloud). Downsampling the point clouds at least for the purpose of identifying tiepoints can reduce the number of points to be evaluated and/or for which a descriptor is to be computed, which can decrease processing resources required for performing the tiepoint matching. For example, cloud generating component 160 downsample the captured point clouds to a voxelized point cloud where each voxel is an average of the pixels being downsampled. In one specific example, cloud generating component 160 can voxelize the point cloud based on a distance, such as four centimeters (cm), such that each voxel is an average of points in a 4 cm×4 cm box at which the voxel is the center. In any case, in some examples, feature extracting component 164 can compute the FPFH descriptor at each voxel location in the point clouds (as downsampled or otherwise), and tiepoint matching component 302 can identify descriptors and associate the points if they lie close together in 33D descriptor space. In one example, tiepoint matching component 302 can apply a Lowe's ratio test to reduce false descriptor matches. In this regard, for example, tiepoint matching component 302 can associate the first subset of points within the first 3D point cloud with the second subset of points within the second 3D point cloud. This association may yield many associations, which can be refined as described herein to further reduce processing required to consider each association in later stage of the object dimensioning.

In another example, the method 600 can optionally include, at 608, extracting the first subset of points and the second subset of points having a threshold descriptor entropy. For example, feature extracting component 164, e.g., in conjunction with processor 120, memory 150, etc., can extract the first subset of points and the second subset of points having the threshold descriptor entropy. This can be another optimization to performing the association of points at 602. In addition, in some examples, feature extracting component 164 can extract the features from the downsampled point clouds for further optimization. In an example, entropy can be defined as a log function of the values of the descriptor, which can provide an indication of how different the values of the descriptor are with respect to one another (e.g., how much variance there is between the 0-255 values of each of the 33 different descriptors). A higher entropy value can indicate a FPFH having a richer internal structure, which may yield a more unique or interesting descriptor, such that finding matching points that have such descriptors may possibly be a more likely actual real world match. In this example, feature extracting component 164 can correlate FPFH descriptor entropy with geometrical interest of the point's 3D world space location. In some examples, feature extracting component 164 can ignore low-entropy points to increase efficiency of subsequent actions in object dimensioning described below.

The method 600 can include, at 610, refining the first subset of points to generate a first improved subset of points that includes fewer outlier point correspondences to the second subset of points than did the first subset of points. For example, outlier rejecting component 304, e.g., in conjunction with processor 120, memory 150, multi-cloud stitching component 166, etc., can refine the first subset of points to generate the first improved subset of points that includes fewer outlier point correspondences to the second subset of points than did the first subset of points. Similar, method 600 can also include, at 612, refining the second subset of points to generate a second improved subset of points that includes fewer outlier point correspondences to the first subset of points than did the second subset of points. For example, outlier rejecting component 304, e.g., in conjunction with processor 120, memory 150, multi-cloud stitching component 166, etc., can refine the second subset of points to generate the second improved subset of points that includes fewer outlier point correspondences to the first subset of points than did the second subset of points.

In other words, in some examples, given the point correspondences associated between the first subset of points in the first 3D point cloud and the second subset of points in the second 3D point cloud, outlier rejecting component 304 can remove some of the point correspondences to improve accuracy and/or efficiency of remaining actions in the object dimensioning, such as cloud pair registration or motion synchronization, as described further herein. In some examples, outlier rejecting component 304 can evaluate multiple points from the first subset with multiple points from the second subset to verify whether the multiple points are to remain as tiepoints between the two subsets of points. For example, outlier rejecting component 304 can compute a distance between the multiple points in each 3D point cloud to determine if the distances are within a threshold correspondence, and if so, the tiepoints can remain associated between the first and second subsets. If not, outlier rejecting component 304 can remove the association between at least one of the multiple points in the first subset and the corresponding one of the multiple points in the second subset.

FIG. 8 illustrates an example of point clouds 800 and 802 and corresponding feature spaces, such as descriptor spaces 804 and 806, as well as point clouds 810 and 812 and a graph representation of tiepoint consistency 814 in accordance with aspects described herein. Point cloud 800 can represent a LHS point cloud of a leaf captured by a TOF sensor 110 in a 3D world space, and point cloud 802 can represent a RHS point cloud of the same leaf captured by the TOF sensor 110 in the 3D world space from a different position/ orientation. Feature extracting component 164 can generate FPFH descriptors for the LHS point cloud 800 and the RHS point cloud 802. In an example, tiepoint matching component 302 can detect point f in LHS point cloud 800 and point f' in RHS point cloud 802 to have point correspondence based on having similar descriptors F and F' in 33D descriptor spaces 804 and 806. Similarly, in an example, tiepoint matching component 302 can detect point g in LHS point cloud 800 and point g' in RHS point 802 cloud to have point correspondence based on having similar descriptors G and G' in 33D descriptor spaces 804 and 806. In an example, outlier rejecting component 304 can determine that a first distance between f and g and a second distance between f' and g', with respect to their corresponding real world space, are within a threshold correspondence, and can accordingly retain the associations between f and f, and g and g', in the improved subsets of points.

Point cloud 810 can represent a point cloud, called LHS in the figure, of a leaf captured by a TOF sensor 110 in a 3D world space, and point cloud 812 can represent a point cloud, called RHS in the figure, of the same leaf captured by the TOF sensor 110 in the 3D world space from a different position. Feature extracting component 164 can generate FPFH descriptors for the LHS point cloud 810 and the RHS point cloud 812. In an example, tiepoint matching component 302 can detect points 820-a, 822-a, 824-a, and 826-a in LHS point cloud 800 and points 820-b, 822-b, 824-b, and 826-b in RHS point cloud 802, respectively, to have point correspondence based on having similar descriptors in 33D descriptor spaces. In an example, outlier rejecting component 304 can determine that distances between points 820-a, 822-a, 824-a, and/or between 820-b, 822-b, 824-b, etc. are within a threshold correspondence, and can accordingly retain the associations between these points in the respective improved subsets of points. In an example, outlier rejecting component 304 can determine that a first distance between point 826-a and one of the points 820-a, 822-a, or 824-a, and a second distance between 826-b and a corresponding one of 820-b, 824-b, or 826-b are not within a threshold correspondence, and can accordingly remove the association between points 826-a and 826-b in the respective improved subsets of points. This is also shown in the graph representation of tiepoint consistency, where there is correspondence in each of points 820 (820-a and 820-b), 822 (822-a and 822-b), and 824 (824-a and 824-b), and as such, these points can be said to form a clique, but there is no correspondence for point 826 (826-a and 826-b). Removing association of points 826-a and 826-b as outliers can reduce the processing performed in later actions of object dimensioning, as described below.

As described, for example, outlier tiepoint rejection can be a maximum clique problem that can be solved to discover the tiepoints having threshold correspondences and distances to determine which points in the subsets are most likely the same point in a common coordinate system (though their coordinates may be different in the corresponding 3D point clouds of the captured TOF frames). In another example, outlier rejecting component 304 can further search for tiepoint triangles (e.g., instead of or after searching for pairs) having a point correspondence and distance correspondence, to determine which points to retain in the improved subsets of points. For example, outlier rejecting component 304 can search the first subset of points for tiepoint triangles (f, g, h) among surviving features that is consistent with a triangle (f, g', h') in the second subset of points. In this example, outlier rejecting component 304 can retain endpoints (a, b) and (a', b') from the triangles' longest sides in the first and second improved subsets of points, respectively. In addition, in this example, outlier rejecting component 304 can retain (c, c') tiepoint if |c−a|=|c'−a'| and |c−b|=|c'−b'| up to some noise threshold. This can result in the improved sets of points having further geometrical consistency.

The method 600 can include, at 614, determining, based on point correspondences between the first improved subset of points and the second improved subset of points, a relative rotation and translation between the first 3D point cloud and the second 3D point cloud. For example, cloud pair registering component 306, e.g., in conjunction with processor 120, memory 150, multi-cloud stitching component 166, etc., can determine, based on point correspondences between the first improved subset of points and the second improved subset of points, the relative rotation and translation between the first 3D point cloud and the second 3D point cloud. In an example, at least three valid tiepoint matches can be enough to properly determine the relative rotation and translation between the point clouds, and outlier rejecting component 304 can generate the improved subsets of points in an attempt to include valid tiepoints using the processing described above. Given the improved sets of tiepoints, cloud pair registering component 306 can derive rotation R and translation T of the second 3D point cloud with respect to the first 3D point cloud (or vice versa) by removing centers-of-mass from the sets of 3D inputs, calculating R from a singular value decomposition, and fixing T after R is known. In an example, cloud pair registering component 306 may perform such cloud pair registering for TOF frame pairs having at least a threshold number (e.g., 10) of geometrically-consistent tiepoint matches. If the TOF frames do not have at least the threshold number of matches, for example, multi-cloud stitching component 166 may reject the TOF frames or otherwise send an error or other feedback to capture new or additional replacement TOF frames, as described above. In another example, where the TOF frames have more than the threshold number of matches, cloud pair registering component 306 can select a number of the tiepoints equal to the threshold for determining the rotation and translation (e.g., the first number of tiepoints, a random selection of the number of tiepoints, etc.).

The method 600 can include, at 616, aligning the first 3D point cloud and the second 3D point cloud within a common coordinate system based on the relative rotation and translation. For example, cloud pair registering component 306, e.g., in conjunction with processor 120, memory 150, multi-cloud stitching component 166, motion synchronizing component 308, bundle adjusting component 310, etc., can align the first 3D point cloud and the second 3D point cloud within the common coordinate system based on the relative rotation and translation. In an example, cloud pair registration can yield a redundant set of relative poses among TOF frames, and relative rotations and translations can have associated noise. As such, for example, as part of determining the relative rotation and translation at 614 and/or aligning the point clouds at 616, motion synchronizing component 308 can calculate absolute TOF images optimally consistent with input set of relative transformations to synchronize the TOF images. The TOF poses can be in substantially any common coordinate system, which may include the coordinate system of the first TOF image.

For example, cloud pair registering component 306 can align the point clouds based on the determined rotation and translation to the common coordinate system, which may be the coordinate system of the first TOF image. In this regard, the aligned point clouds may generate a combined point cloud in the common coordinate system. In addition, in some examples, aligning the point clouds can include bundle adjusting component 310 that more accurately aligns the 3D point clouds. For example, bundle adjusting component 310 can start with the motion-synchronized tiepoints' 3D positions output by motion synchronizing component 308, and can initialize reconstructed points from synchronized point averages. Bundle adjusting component 310 can form cost functions from discrepancies between reconstructed points and back-projected counterparts, and minimize the cost by varying the TOF rotations and translations and reconstructed point positions. The result can be aggregated point clouds and corresponding frusta returned in a common coordinate system, which may be the coordinate system of one of the TOF images (e.g., the first TOF image). Scene knowledge can propagate between the stitched cloud and TOF views via 3D geometry.

In some examples, multi-cloud stitching component 166 can perform the above actions described in method 600 for multiple additional point clouds corresponding to other TOF images, such as for four point clouds corresponding to four TOF images that are substantially 30 degrees in azimuth around an object, and can construct the stitched point cloud of the four point clouds in the common coordinate system. In an example, display device 140 can display a representation of the stitched point cloud. In another example, the stitched point cloud can further be used for target object isolation, object dimensioning, etc., as described further herein.

FIG. 9 illustrates an example of a method 900 for isolating a target object in multiple TOF images for performing dimensioning thereof in accordance with aspects described herein. The method 900 may be performed by a sensor system 100, one or more components thereof, such as a processor 120, etc.

The method 900 can include, at 902, transforming multiple images from a TOF sensor into multiple 3D point clouds. For example, cloud generating component 160, e.g., in conjunction with processor 120, memory 150, etc., can transform multiple images from a TOF sensor 110 into multiple 3D point clouds. As described above, cloud generating component 160 can generate an aggregated 3D point cloud for a given position based on the multiple views in a view pair or other collection of multiple images at a given position. Cloud generating component 160 can also generate a separate 3D point cloud for each position.

The method 900 can include, at 904, identifying, in each of the multiple 3D point clouds, possible large planes having a minimal threshold size. For example, plane identifying component 162, e.g., in conjunction with processor 120, memory 150, etc., can identify, in each of the multiple 3D point clouds, possible large planes having a minimal threshold size. As described above, plane identifying component 162 can identify large planes in each of the multiple 3D point clouds as collections of adjacent points having a same surface normal, where a large plane can be determined as having a minimum threshold size (e.g., a minimum threshold number of points having the same surface normal). The plane identifying component 162 can identify at least one large surface as a floor and/or may identify at least another large surface as a wall, etc. In some examples, plane identifying component 162 can differentiate the floor plane from the wall plane based on a size of each of the planes, a proximity of the planes to Z=0 plane (e.g., the floor can be closer to the Z=0 plane), etc. Once the 3D point clouds are stitched, as described above and further herein with reference to action 906, the floor plane and/or wall plane and/or other large planes can be identified in the common coordinate system of the common 3D point cloud based on their coordinate locations in each corresponding 3D point clouds from the TOF sensor 110.

The method 900 can include, at 906, generating a common 3D point cloud by aligning rotated and translated point clouds corresponding to at least a portion of the multiple 3D point clouds. For example, multi-cloud stitching component 166, e.g., in conjunction with processor 120, memory 150, etc., can generate the common 3D point cloud (in a common coordinate system) by aligning rotated and translated point clouds corresponding to at least the portion of the multiple 3D point clouds. As described above, multi-cloud stitching component 166 can rotate and translate the multiple 3D point clouds, and can align the multiple 3D point clouds to generate the common 3D point cloud as described in various examples above.

The method 900 can include, at 908, rotating and translating the common 3D point cloud to have the floor aligned with a Z-plane. For example, target isolating component 168, e.g., in conjunction with processor 120, memory 150, etc., can rotate and translate the common 3D point cloud to have the floor aligned with the Z=0 plane. For example, plane identifying component 162 can identify coordinates in the common 3D point cloud and/or in the multiple 3D point clouds that form the common 3D point cloud, that belong to large planes. In addition, for example, plane identifying component 162 can identify one large plane as a floor, which may include identifying the plane having the largest size, a plane that is substantially at or closest to the ground plane (e.g., Z=0 plane), etc. In any case, target isolating component 168 can rotate and translate the common 3D point cloud to put the identified floor plane at the ground (e.g., at Z=0) in the common coordinate system.

The method 900 can include, at 910, isolating the target object from the common 3D point cloud as rotated and translated. For example, target isolating component 168, e.g., in conjunction with processor 120, memory 150, etc., can isolate the target object from the common 3D point cloud as rotated and translated. Various actions can be performed to isolate the target object, as described further in FIG. 10.

FIG. 10 illustrates an example of a method for isolating the target object from the common 3D point cloud as rotated and translated at 910 in accordance with aspects described herein. In some examples, isolating the target object can include deducing an average position of the TOF sensor 110 when taking the images to infer a location of the target object as being within a threshold distance of a center of the position of capture. For example, isolating the target object at 910 can optionally include, at 1002, projecting an average location of reconstructed TOF frusta in the aligned point clouds into the ground plane as an origin. For example, target isolating component 168, e.g., in conjunction with processor 120, memory 150, etc., can project the average location of reconstructed TOF frusta in the aligned point clouds into the ground plane as the origin, where the origin can correspond to an (X, Y) coordinate on the Z=0 plane at which the TOF image was captured. For example, target isolating component 168 can reconstruct the TOF frusta from the 3D point cloud and can take the average position thereof projected into the Z=0 plane as the origin.

For example, isolating the target object at 910 can optionally include, at 1004, averaging a pointing direction for the reconstructed frusta within the ground plane. For example, target isolating component 168, e.g., in conjunction with processor 120, memory 150, etc., can average the pointing direction for the reconstructed frusta within the ground plane (e.g., the Z=0 plane), which can define a preferred axis from the origin to an area within which the target object can be detected and/or isolated.

For example, isolating the target object at 910 can optionally include, at 1006, modifying a common 3D point cloud by removing points lying outside a subcloud annulus of the common 3D point cloud between two ground plane circles centered on the origin, and removing points outside a subcloud azimuthal wedge defined by a specified number of degrees from the pointing direction. For example, target isolating component 168, e.g., in conjunction with processor 120, memory 150, etc., can modify the common 3D point cloud by removing points lying outside a subcloud annulus of the common 3D point cloud between two ground plane circles centered on the origin, and removing points outside the subcloud azimuthal wedge defined by a specified number of degrees from the pointing direction.

For example, removing points lying outside a subcloud annulus of the common 3D point cloud between two ground plane circles centered on the origin can limit the target object distance from the origin to lie within a certain interval (e.g., 0.75 meters to 4.0 meters) defined between the subcloud annuli. This can model an assumption that the user did not place the TOF sensor 110 too close or too far from the target object being imaged for dimensioning.

In addition, for example, removing points outside the subcloud azimuthal wedge defined by a specified number of degrees from the pointing direction can limit the target object to lie within the number of degrees from the pointing direction (e.g., 40 degrees in either direction of the preferred axis). This can model an assumption that the user intended to center the TOF sensor 110 largely based on the location of the target object. Removing the outlier points in this example can improve accuracy of locating the target object to be isolated and/or can improve processing time for identifying and/or isolating the target object.

For example, isolating the target object at 910 can optionally include, at 1008, modifying the common 3D point cloud to remove points associated with one or more large planes. For example, target isolating component 168, e.g., in conjunction with processor 120, memory 150, etc., can modify the common 3D point cloud to remove points associated with one or more large planes. As described above, target isolating component 168 can detect points in the common 3D point cloud that are associated with the one or more large planes, such as a floor or wall or other large plane, based on the coordinates identified by plane identifying component 162. Target isolating component 168 can remove these points from the common 3D point cloud to further isolate the target object.

For example, isolating the target object at 910 can optionally include, at 1010, converting the common 3D point cloud to a height map and remove points associated with objects less than a threshold size or objects that are not closest to the pointing direction from the origin. For example, target isolating component 168, e.g., in conjunction with processor 120, memory 150, etc., can convert the common 3D point cloud to the height map and remove the points associated with object less than the threshold size or objects that are not closest to the pointing direction from the origin. In some examples, target isolating component 168 can take the remaining points of the common 3D point cloud, after removing the points associated with the large plans and the points outside of the subcloud annulus and subcloud azimuthal wedge, and project them down into the ground plane. This can yield point clouds for objects in the X, Y coordinates. In this example, target isolating component 168 can remove subclouds (also referred to herein as point collections or connected components) associated with objects in the ground plane view that are less than a threshold size (e.g., 8 inches). Among the remaining subclouds, in some examples, target isolating component 168 can retain the subcloud(s) that lie closest to the pointing direction from the origin, as described with reference to action 1004 above, and can discard any remaining subclouds. Thus, the remaining subcloud of the target object can be assumed to be the one having at least a threshold size and closest to the pointing direction line from the origin to the space of the 3D point clouds.

Returning to FIG. 9, the method 900 can optionally include, at 912, computing dimensional measurements of the target object within the common coordinate system. For example, WLH component 170, e.g., in conjunction with processor 120, memory 150, etc., can compute the dimensional measurements of the target object within the common coordinate system. In some examples, WLH component 170 can fit a bounding box around the target object isolated by target isolating component 168. For example, WLH component 170 can search a seven-dimensional parameter space for a tightest bounding box that surrounds the subcloud of the target object in the common coordinate system. The seven parameters of the seven-dimensional parameter space can include box dimensions (W, L, H) of the bounding box, a box center (X, Y, Z), and a box orientation azimuth (Az). WLH component 170 can determine the bounding box based on the seven parameters.

The method 900 can optionally include, at 914, displaying an indication of the dimensional measurements. For example, display device 140, e.g., in conjunction with processor 120, memory 150, etc., can display an indication of the dimensional measurements, such as the WLH measurements of the bounding box as determined by WLH component 170. The displayed indication can include numbers corresponding to each of the width, length, and height measurements, a bounding box draw around the target object in a view on the display device 140 (to ensure the proper object is being dimensioned), etc.

The method 900 can optionally include, at 916, displaying the target object as isolated from the common 3D point cloud. For example, display device 140, e.g., in conjunction with processor 120, memory 150, etc., can display the target object as within the common 3D point cloud. In some examples, display device 140 can display one or more projections of the common 3D point cloud as captured in the TOF images. For example, display device 140 can display a top orthographic view of the cloud, a front orthographic view of the cloud, and/or a side orthographic view of the cloud. In addition, for example, display device 140 can display the orthographic views with the bounding box drawn based on the WLH measurements. In addition, in an example, display device 140 can display a generic perspective view of the scene captured in one of the TOF images along with the bounding box drawn in 3D around the target object in the common coordinate system. In these examples, the displays and/or the point clouds used for object dimensioning can bring together depth information from multiple TOF sensor 110 images, IR information from the images, 3D geometries of the images, etc.

In some examples, WLH component 170 can transmit the WLH measurements and/or the point cloud views described above to another device for storage or further processing, such as a system for determining packaging or shipping logistics. In another example, WLH component 170 can store the WLH measurements and/or point cloud views described above in memory 150 for recalling the measurements or displays on display device 140.

The following aspects are illustrative only and aspects thereof may be combined with aspects of other embodiments or teaching described herein, without limitation.

Aspect 1 is a method for obtaining images from a TOF sensor for determining dimensions of an object including displaying, via an interface, a prompt to capture at least one image of an object, capturing, based on an interaction with the prompt, at least one image of the object, determining whether multiple images including the at least one image are sufficient for performing object dimensioning, and where the multiple images are sufficient for performing object dimensioning, providing the images for performing object dimensioning to compute or display dimensions of the object.

In Aspect 2, the method of Aspect 1 includes displaying, via the interface or other feedback, an indication of a position relative to the object for capturing a next image of the object.

In Aspect 3, the method of Aspect 2 includes where the position is substantially 30 degrees in azimuth from a previous position relative to the object at which the at least one image is captured.

In Aspect 4, the method of any of Aspects 1 to 3 includes where determining whether the multiple images are sufficient for performing object dimensioning includes determining whether the multiple images include a certain number of images.

In Aspect 5, the method of any of Aspects 1 to 4 includes where determining whether the multiple images are sufficient for performing object dimensioning includes determining whether the multiple images include two or more images for each of multiple positions relative to the object.

In Aspect 6, the method of any of Aspects 1 to 5 includes where the multiple images are not sufficient for performing object dimensioning, displaying, via the interface, a prompt to recapture the at least one image of the object.

In Aspect 7, the method of Aspect 6 includes indicating, via the interface or other feedback, an indication of a position relative to the object for recapturing the at least one image of the object.

In Aspect 8, the method of any of Aspects 1 to 7 includes where the at least one image includes two images of the object captured at a similar position, and further comprising determining whether to keep the two images of the object for performing object dimensioning based at least in part on whether the two images have enough distinction to achieve a threshold signal-to-noise ratio.

In Aspect 9, the method of any of Aspects 1 to 8 includes determining whether to keep the at least one image of the object for performing object dimensioning based at least in part on whether the object is of a threshold size in the at least one image.

In Aspect 10, the method of any of Aspects 1 to 9 includes receiving, as part of performing the object dimensioning, width, length, and height measurements of the object, and displaying, via the interface, an indication of the width, length, and height measurements of the object.

In Aspect 11, the method of Aspect 10 includes displaying one or more orthographic views of the object with the indication of the width, length, and height measurements of the object as a bounding box around the object.

In Aspect 12, the method of any of Aspects 1 to 11 includes providing the at least one image for object dimensioning while awaiting capture of a next image of the object from a next position.

In Aspect 13, the method of any of Aspects 1 to 12 includes outputting a feedback score indicating a degree to which the multiple images correspond to desired positions for capturing the object.

Aspect 14 is a method for obtaining images from a TOF sensor for determining dimensions of an object including obtaining, from the TOF sensor, multiple images including the object, validating whether the multiple images are taken at desired poses relative to the object, and where the multiple images are validated as taken at the desired poses, providing the multiple images for object dimensioning to compute or display dimensions of the object.

In Aspect 15, the method of Aspect 14 includes receiving, from a positioning sensor associated with the TOF camera, a position for each of the multiple images, where validating whether the multiple images are taken at desired poses is based on comparing at least a first position for one of the multiple images and at least a second position for a different one of the multiple images.

In Aspect 16, the method of any of Aspects 14 or 15 includes where validating whether the multiple images are taken at desired poses includes determining that the multiple images are taken at positions separated by substantially 30 degrees in azimuth around the object.

In Aspect 17, the method of Aspect 16, where validating whether the multiple images are taken at desired poses includes determining that the multiple images include at least four images that are taken at positions separated by substantially 30 degrees in azimuth around the object.

In Aspect 18, the method of any of Aspects 14 to 17, where validating whether the multiple images are taken at desired poses includes validating that the multiple images include, for each position of the desired poses, at least two images.

In Aspect 19, the method of any of Aspects 14 to 18 includes where validating whether the multiple images are taken at the desired poses is based on a model of the object, where the desired poses are inferred from the model of the object.

Aspect 20 is a method for aligning multiple 3D point clouds into a common 3D point cloud including associating a first subset of points within a first 3D point cloud generated from one TOF view with a second subset of points within a second 3D point cloud generated from another TOF view based on each point in the first subset of points having a threshold correspondence to a unique counterpart point in the second subset of points, refining the first subset of points and the second subset of points to generate a first improved subset of points that includes fewer outlier point correspondences to the second subset of points than the first subset of points and a second improved subset of points that includes fewer outlier point correspondences to the first subset of points than the second subset of points, determining, based on point correspondences between the first improved subset of points and the second improved subset of points, a relative rotation and translation between the first 3D point cloud and the second 3D point cloud, and aligning the first 3D point cloud and the second 3D point cloud within a common coordinate system based on the relative rotation and translation.

In Aspect 21, the method of Aspect 20 includes generating first FPFHs for points in the first subset of points and second FPFHs for points in the second subset of points, where associating a first point of the first subset of points with a second point of the second subset of points is based on determining whether a distance between a first FPFH descriptor for the first point in the first FPFHs and a second FPFH descriptor for the second point in the second FPFHs is within a threshold difference.

In Aspect 22, the method of any of Aspects 20 or 21 includes extracting the first subset of points from the first 3D point cloud having at least a threshold descriptor entropy, and extracting the second subset of points from the second 3D point cloud having at least the same threshold descriptor entropy, where associating the first subset of points and the second subset of points includes evaluating the first subset of points and the second subset of points for descriptor correspondence.

In Aspect 23, the method of any of Aspects 20 to 22 includes where refining the first subset of points and the second subset of points includes using a Lowes ratio test on 33-dimensional descriptors of the first subset of points and the second subset of points to compare points in the first subset of points and the second subset of points having point correspondence, and retaining, in the first improved subset of points and the second improved subset of points, points that pass the Lowes ratio test.

In Aspect 24, the method of any of Aspects 20 to 23 includes where refining the first subset of points and the second subset of points includes comparing a first distance between a first portion of points from the first subset of points with a second distance between a second portion of corresponding points from the second subset of points, and retaining, in the first improved subset of points, the first portion of points and, in the second improved subset of points, the second portion of points, if the difference between the first distance and second distance is less than a threshold.

In Aspect 25, the method of any of Aspects 20 to 25 includes where refining the first subset of points and the second subset of points includes for each first portion of points in the first subset of points and second portion of points in the second subset of points having separation distances less than a threshold, comparing the separation distances between a third point in the first subset of points and the first portion of points with counterpart separation distances between the corresponding third point in the second subset of points and the second portion of points, and retaining, in the first improved subset of points, the first portion of points and the third point in the first subset of points and, in the second improved subset of points, the second portion of points and the corresponding third point in the second subset of points, if the separation distances and the counterpart separation distances are less than a threshold.

In Aspect 26, the method of any of Aspects 20 to 25 includes downsampling a first captured point cloud into the first 3D point cloud, and downsampling a second captured point cloud into the second 3D point cloud.

In Aspect 27, the method of any of Aspects 20 to 26 includes aligning one or more 3D point clouds with the first 3D point cloud in a common coordinate system using relative rotations and translations calculated via motion synchronization and bundle adjustment.

In Aspect 28, the method of any of Aspects 20 to 27 includes computing dimensional measurements of an object within the common coordinate system.

In Aspect 29, the method of Aspect 28 includes displaying an indication of the dimensional measurements.

Aspect 30 is a method for isolating a target scene object from multiple images of a TOF sensor, including transforming the multiple images from a TOF sensor into multiple 3D point clouds, identifying, in each of the multiple 3D point clouds, one or more large planes having a minimal threshold size, generating a common 3D point cloud by aligning rotated and translated point clouds corresponding to at least a portion of the multiple 3D point clouds, rotating and translating the common 3D point cloud to have one of one or more large planes identified as a ground plane within a common coordinate system of the common 3D point cloud, and isolating a target object from the common 3D point cloud as rotated and translated.

In Aspect 31, the method of Aspect 30 includes where isolating the target object includes projecting an average location of reconstructed TOF frusta in the common 3D point cloud into the ground plane as an origin, averaging a pointing direction for the reconstructed TOF frusta within the ground plane, and modifying the common 3D point cloud by removing points lying outside a subcloud annulus of the common 3D point cloud between two ground plane circles centered on the origin, and removing points outside a subcloud azimuthal wedge defined by a specified number of degrees from the pointing direction.

In Aspect 32, the method of any of Aspects 30 or 31 includes where isolating the target object includes further removing points from the common 3D point cloud that are associated with the one or more large planes representing the floor or potential walls.

In Aspect 33, the method of any of Aspects 30 to 32 includes where isolating the target object includes converting the common 3D point cloud to a height map, and removing points from the common 3D point cloud that are associated with objects less than a threshold size.

In Aspect 34, the method of Aspect 33 includes where isolating the target object includes selecting a subcloud having points closest in position to the preferred axis defined by the pointing direction from the origin.

In Aspect 35, the method of any of Aspects 30 to 34 includes displaying, on a screen interface, the target object as isolated from the common 3D point cloud.

In Aspect 36, the method of any of Aspects 30 to 35 includes measuring a width, length, and height dimension of the target object as isolated from the common 3D point cloud.

In Aspect 37, the method of Aspect 36 includes searching a seven dimensional parameter space for a bounding box that surrounds the target object, where measuring the width, length, and height of the target object is based on the width, length, and height of the bounding box.

In Aspect 38, the method of Aspect 37 includes displaying, on a screen interface, the common 3D point cloud and the bounding box surrounding the target object.

In Aspect 39, the method of Aspect 38 includes where displaying the target object includes jointly displaying the common 3D point cloud and the bounding box surrounding the target object within three orthographic projections.

Aspect 40 is an imaging system including a TOF sensor or a processor, wherein one of the TOF sensor or the processor is configured to perform one or more of the operations of one or more of the methods in any of Aspects 1 to 39.

Aspect 41 is an apparatus including means for performing the operations of one or more methods in any of Aspects 1 to 39.

Aspect 42 is a computer-readable medium including code executable by one or more processors to perform the operations of one or more methods in any of Aspects 1 to 39.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. For example, changes may be made in the function and arrangement of elements discussed without departing from the scope of the disclosure. Also, various examples may omit, substitute, or add various procedures or components as appropriate. For instance, the methods described may be performed in an order different from that described, and various steps may be added, omitted, or combined. Also, features described with respect to some examples may be combined in other examples. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

Further, for example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example aspects, the functions described may be implemented in hardware, software, or any combination thereof. If implemented in software, the functions may be stored on or encoded as one or more instructions or code on a non-transitory computer-readable medium. Computer-readable media includes computer storage media. Storage media may be any available media that may be accessed by a computer. By way of example, and not limitation, such computer-readable media may comprise a random-access memory (RAM), a read-only memory (ROM), an electrically erasable programmable ROM (EE-PROM), optical disk storage, magnetic disk storage, other magnetic storage devices, combinations of the aforementioned types of computer-readable media, or any other medium that may be used to store computer executable code in the form of instructions or data structures that may be accessed by a computer. Further, features implementing functions may also be physically located at various positions, including being distributed such that portions of functions are implemented at different physical locations.

Also, the various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A method for isolating a target scene object from multiple images of a time-of-flight (TOF) sensor, comprising:

transforming the multiple images from a TOF sensor into multiple three-dimensional (3D) point clouds;

identifying, in each of the multiple 3D point clouds, multiple large planes having a minimal threshold size;

identifying one of the multiple large planes as a ground plane;

generating a common 3D point cloud by aligning rotated and translated point clouds corresponding to at least a portion of the multiple 3D point clouds;

rotating and translating the common 3D point cloud to have the ground plane within a common coordinate system of the common 3D point cloud; and isolating a target object from the common 3D point cloud
as rotated and translated, including:
projecting an average location of reconstructed TOF
frusta in the common 3D point cloud into the ground
plane as an origin;
averaging a pointing direction for the reconstructed
TOF frusta within the ground plane; and
modifying the common 3D point cloud by removing
points lying outside a subcloud annulus of the com-
mon 3D point cloud between two ground plane
circles centered on the origin, and removing points
outside a subcloud azimuthal wedge defined by a
specified number of degrees from the pointing direc-
tion.

2. The method of claim 1, wherein isolating the target
object includes selecting a subcloud having points closest in
position to a preferred axis defined by the pointing direction
from the origin.

3. The method of claim 1, wherein isolating the target
object includes further removing points from the common
3D point cloud that are associated with the multiple large
planes.

4. The method of claim 1, wherein isolating the target
object includes:
converting the common 3D point cloud to a height map;
and
removing points from the common 3D point cloud that are
associated with objects less than a threshold size.

5. The method of claim 1, further comprising displaying,
on a screen interface, the target object as isolated from the
common 3D point cloud.

6. The method of claim 1, further comprising measuring
a width, length, and height dimension of the target object as
isolated from the common 3D point cloud.

7. The method of claim 6, further comprising searching a
seven dimensional parameter space for a bounding box that
surrounds the target object, wherein measuring the width,
length, and height of the target object is based on the width,
length, and height of the bounding box.

8. The method of claim 7, further comprising displaying,
on a screen interface, the common 3D point cloud and the
bounding box surrounding the target object.

9. The method of claim 8, wherein displaying the target
object includes jointly displaying the common 3D point
cloud and the bounding box surrounding the target object
within three orthographic projections.

10. A system comprising:
a memory; and
a processor coupled to the memory, wherein the processor
is configured to:
transform multiple images from a time-of-flight (TOF)
sensor into multiple three-dimensional (3D) point
clouds;
identify, in each of the multiple 3D point clouds,
multiple large planes having a minimal threshold
size;
identify one of the multiple large planes as a ground
plane;
generate a common 3D point cloud by aligning rotated
and translated point clouds corresponding to at least
a portion of the multiple 3D point clouds;
rotate and translate the common 3D point cloud to have
the ground plane within a common coordinate sys-
tem of the common 3D point cloud; and
isolate a target object from the common 3D point cloud
as rotated and translated including:

projecting an average location of reconstructed TOF
frusta in the common 3D point cloud into the
ground plane as an origin;
averaging a pointing direction for the reconstructed
TOF frusta within the ground plane; and
modifying the common 3D point cloud by removing
points lying outside a subcloud annulus of the
common 3D point cloud between two ground
plane circles centered on the origin, and removing
points outside a subcloud azimuthal wedge
defined by a specified number of degrees from the
pointing direction.

11. The system of claim 10, wherein the processor is
configured to isolate the target object at least in part by
selecting a subcloud having points closest in position to a
preferred axis defined by the pointing direction from the
origin.

12. The system of claim 10, wherein the processor is
configured to isolate the target object at least in part by
further removing points from the common 3D point cloud
that are associated with the multiple large planes.

13. The system of claim 10, wherein the processor is
configured to isolate the target object at least in part by:
converting the common 3D point cloud to a height map;
and
removing points from the common 3D point cloud that are
associated with objects less than a threshold size.

14. The system of claim 10, wherein the processor is
further configured to display, on a screen interface, the target
object as isolated from the common 3D point cloud.

15. The system of claim 10, wherein the processor is
further configured to measure a width, length, and height
dimension of the target object as isolated from the common
3D point cloud.

16. The system of claim 15, wherein the processor is
further configured to search a seven dimensional parameter
space for a bounding box that surrounds the target object,
wherein measuring the width, length, and height of the target
object is based on the width, length, and height of the
bounding box.

17. A non-transitory computer-readable medium, com-
prising code executable by one or more processors for
isolating a target scene object from multiple images of a
time-of-flight (TOF) sensor, the code comprising code for:
transforming the multiple images from a TOF sensor into
multiple three-dimensional (3D) point clouds;
identifying, in each of the multiple 3D point clouds,
multiple large planes having a minimal threshold size;
identifying one of the multiple large planes as a ground
plane;
generating a common 3D point cloud by aligning rotated
and translated point clouds corresponding to at least a
portion of the multiple 3D point clouds;
rotating and translating the common 3D point cloud to
have the ground plane within a common coordinate
system of the common 3D point cloud; and
isolating a target object from the common 3D point cloud
as rotated and translated, including:
projecting an average location of reconstructed TOF
frusta in the common 3D point cloud into the ground
plane as an origin;
averaging a pointing direction for the reconstructed
TOF frusta within the ground plane; and
modifying the common 3D point cloud by removing
points lying outside a subcloud annulus of the com-
mon 3D point cloud between two ground plane
circles centered on the origin, and removing points outside a subcloud azimuthal wedge defined by a specified number of degrees from the pointing direction.

\* \* \* \* \*